Oct. 12, 1948.        J. O'D. SHEPHERD        2,451,457
              TRAFFIC SIGNAL CONTROL SYSTEM
Filed Sept. 16, 1940                    5 Sheets-Sheet 1
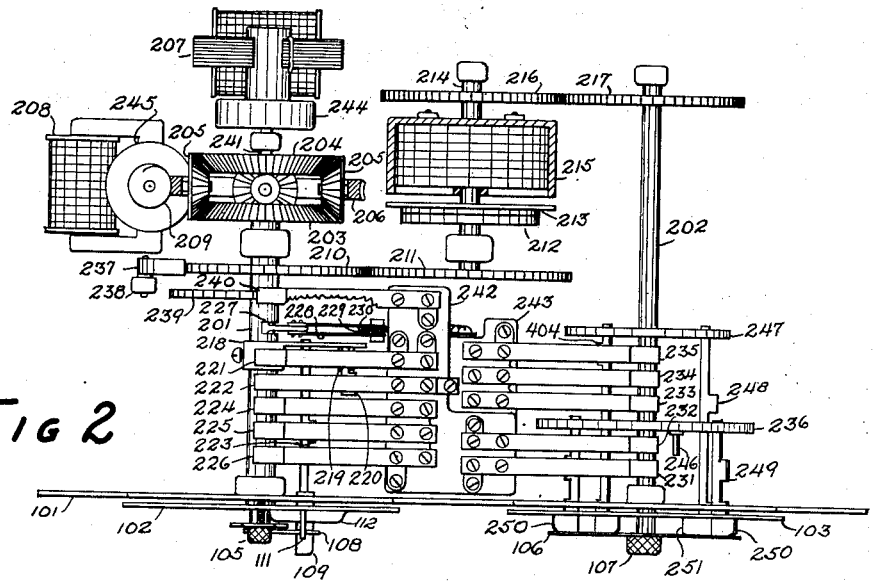
Fig 2
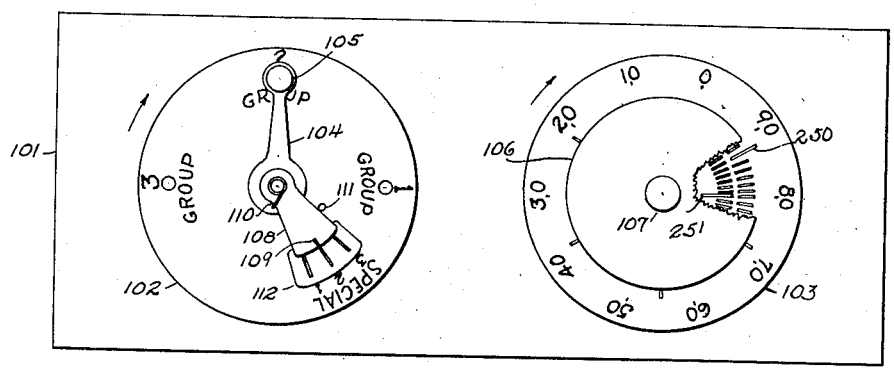
Fig 1
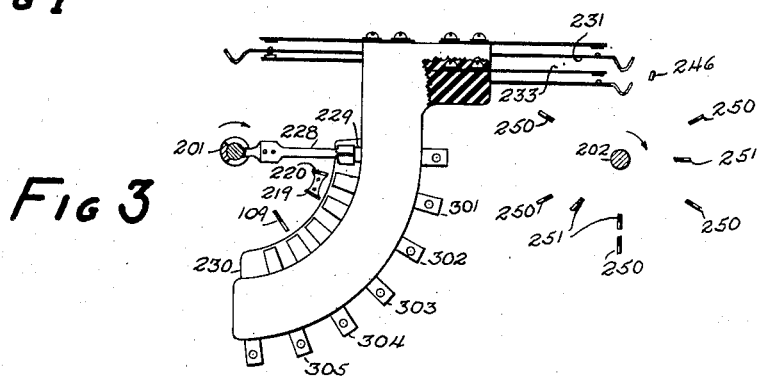
Fig 3
INVENTOR

Oct. 12, 1948.                J. O'D. SHEPHERD                2,451,457
                           TRAFFIC SIGNAL CONTROL SYSTEM
Filed Sept. 16, 1940                                      5 Sheets-Sheet 2
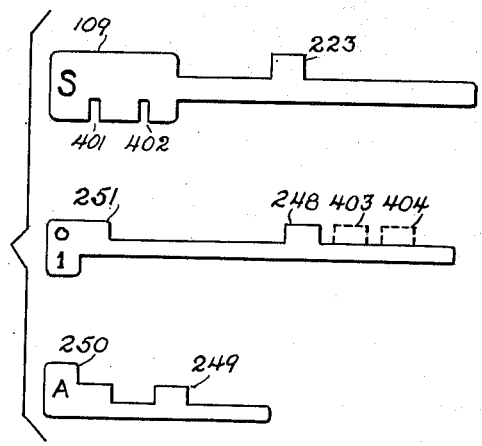
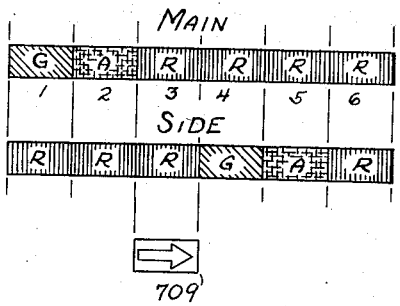
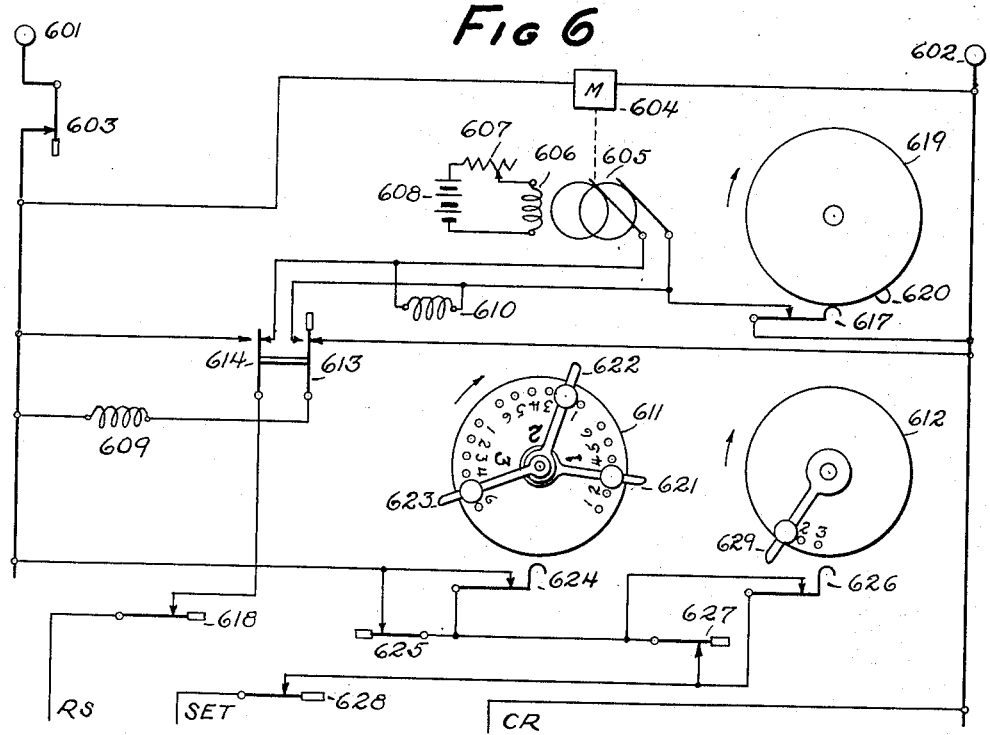
INVENTOR
Judson O'D Shepherd

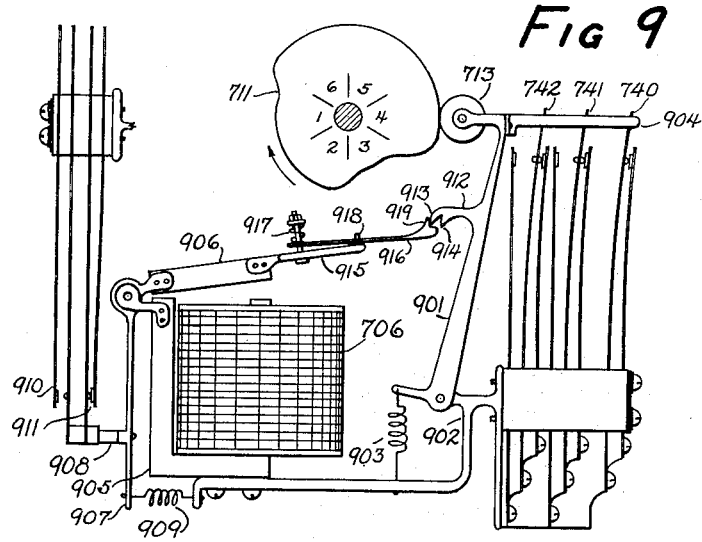
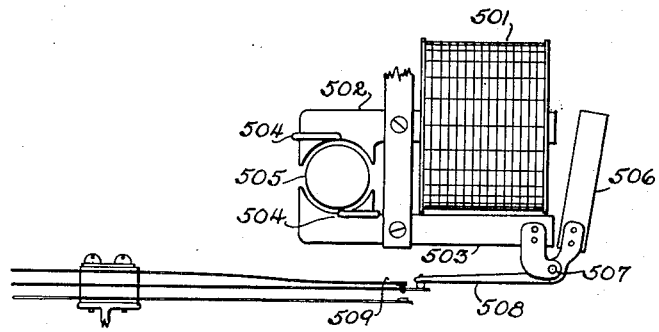
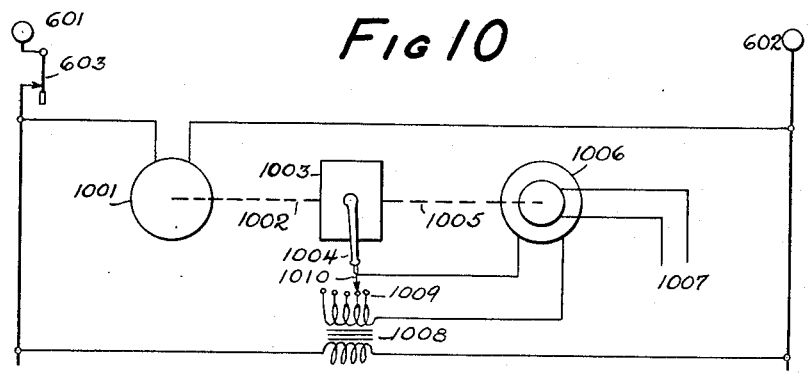

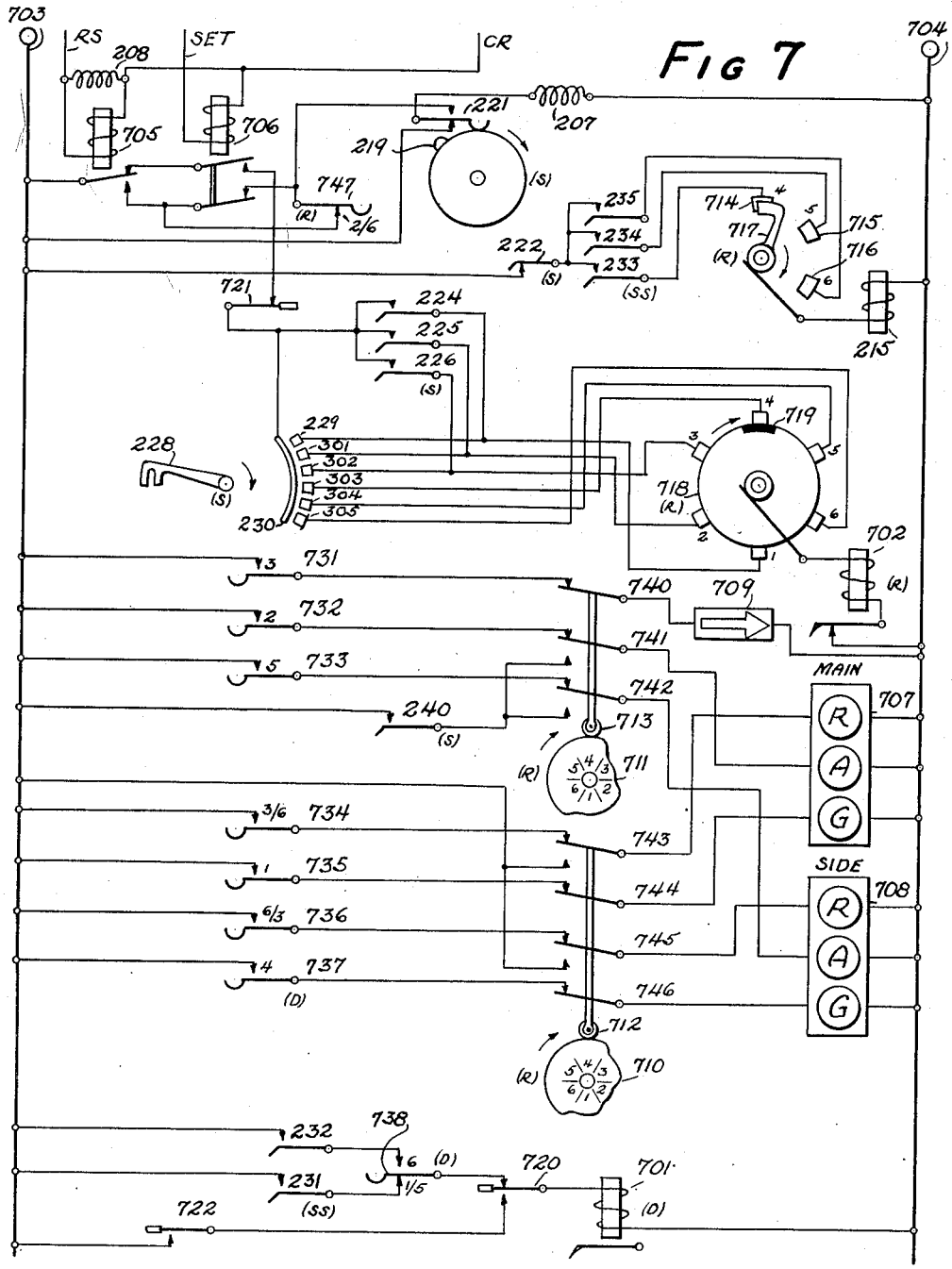

Oct. 12, 1948.    J. O'D. SHEPHERD    2,451,457
TRAFFIC SIGNAL CONTROL SYSTEM
Filed Sept. 16, 1940    5 Sheets-Sheet 5
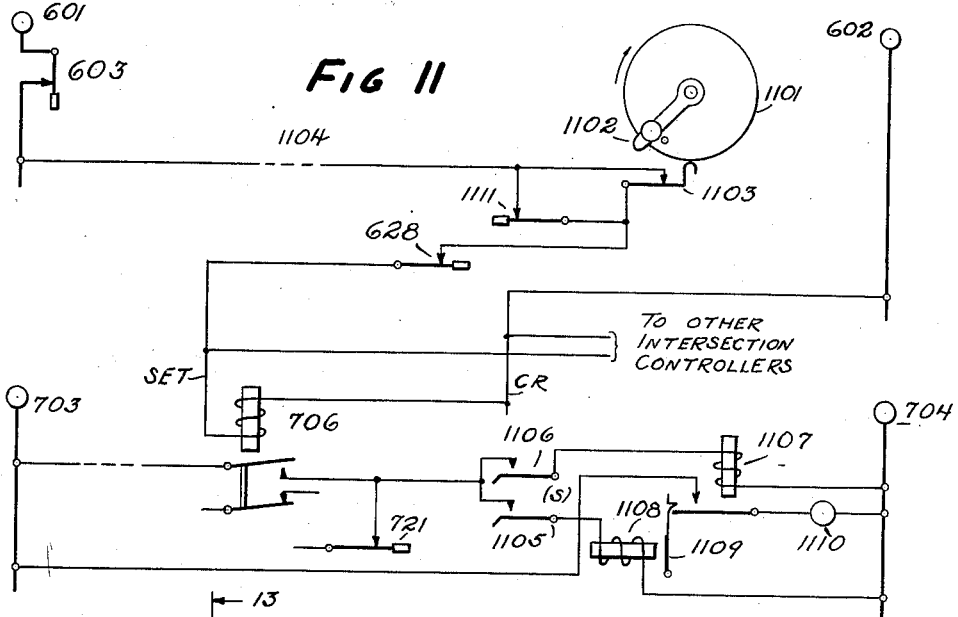
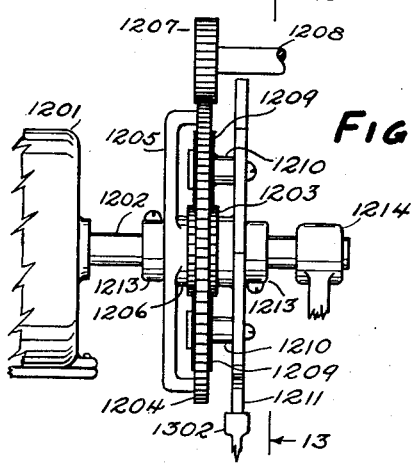
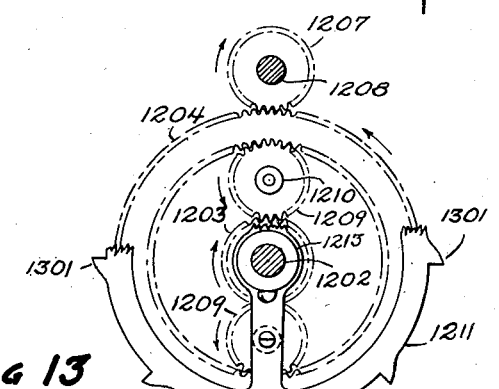
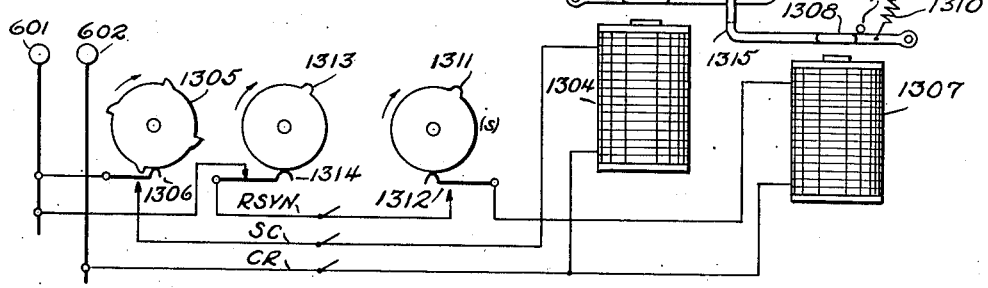
INVENTOR
Judson O'D Shepherd Patented Oct. 12, 1948

2,451,457

UNITED STATES PATENT OFFICE 2,451,457

TRAFFIC SIGNAL CONTROL SYSTEM

Judson O'D. Shepherd, Atlanta, Ga.

Application September 16, 1940, Serial No. 357,022

23 Claims. (Cl. 177—337)

This invention relates to control systems and, more particularly, to systems for controlling the flow of traffic along streets and highways by means of signalling devices at intersections or other suitable locations.

The present invention provides for certain of the objectives set out by my Patent No. 2,173,596 in an improved and more economical manner, together with other features not disclosed therein.

A central or master controller is contemplated with intersection controllers connected thereto by three trunk conductors, including one serving as a common return which may be the grounded conductor of the power distribution system. Each controller is provided with a synchronous drive motor operated from a power supply local thereto, with said controller normally actuating signalling devices, assumed to be signal lamps, cyclically at predetermined times in each cycle. The intersection controllers are controlled over the trunk conductors selectively from the master controller in such manner that they will operate their signal lamps in any of a plurality of different manners as, for example, cyclically at predetermined times in each cycle, cyclically at other predetermined times in each cycle, to provide steady signal indications, to provide flashing ones or to extinguish all of the signal lamps. Each of these operations, including shutdown, will be termed a reset. In describing my invention I show arrangements for six resets, although a greater or smaller number may be employed.

Since all of the intersection controllers are connected in multiple to the trunk conductors and operate in synchronism, the flow of traffic may be coordinated through successive intersections in one direction for one reset, and in the other for a second reset to accommodate for variation in traffic movement along thoroughfares as, for example, the difference in prevailing direction of flow toward the business district in the morning and away from it in the evening. This is accomplished by means to shift the offset of the various controllers for different resets. By offset is meant the relation between the beginning of the traffic cycle at a particular intersection controller and the beginning of the cycle of the master controller. Three different offsets are provided for illustration.

It is desirable that means be provided in a signal system whereby signals at certain intersections can be reset independently of those at other intersections. Illustrative of this, there are streets in the industrial districts of some cities which are practically empty early at night and it would be desirable for the signals in this section to be discontinued from stop-go operation. To effect this operation, I provide, as a feature of my invention, means readily operable whereby the intersection controllers may be grouped and each group controlled independently of the others. Group as used herein does not necessarily represent physical relationship of the intersection controllers but rather those controllers which have substantially the same traffic flow conditions at various times during the day, no matter how widely scattered their locations. In practicing my invention, I may arrange for the signals on the principal thoroughfares to operate in one group, those on secondary streets in the second group and those at relatively unimportant intersections in the third. In the evening at, say, 8 o'clock I may reset group 3 controllers to flash the amber signals as a warning indication. Later in the evening, group 3 may be discontinued from operation and the controllers in group 2 reset to flash the amber signals. Still later in the evening, the latter may be discontinued and those of group 1 made to flash amber until they are discontinued early in the morning. Other group operations may be secured. The same three trunk conductors may serve controllers in all of the groups.

There are special occasions or times of the day in which particular signals may be required to operate in a manner different from the remainder of their group. I provide adjustable means whereby any particular signal or signals may be reset from the master controller for any of three particular operations without disturbing the operation of the group or groups in which they normally operate This is termed herein as a special reset. Three special resets are contemplated for descriptive purposes. The extensive application of this feature to my system will permit all of the signals of the system to be arranged to operate normally in three primary groups and also in three special reset groups. The special reset groups may include any signals of the system, irrespective of their normal grouping. This has many applications of which two will be illustrative. The theatrical districts of large cities and parts of other cities have recurrent conditions which result in such congestion of traffic that stop-go signal operation is ineffective. By appropriate arrangements at the intersection controllers, those signals at the particular intersections involved may be extinguished or caused to provide some other indication, say flashing amber, so that traffic thereat may be directed manually by traffic officers. These signals may normally operate in the several groups and the special reset of the particular signals may be effected without disturbing the other signals in these groups. Another application is for parades whereby one special reset will cause the signals along the route to be extinguished or to provide a suitable indication and those at intersections adjacent to the route to flash amber or present stop indications to traffic approaching the route. These are illustrations of the adaptability of my system to traffic conditions and it will be understood that various other special signal operations for particular circumstances may be effected at selected intersections from the master controller without changing the operation of signals in the primary groups.

A further objective of my invention is to provide control of the total period of the traffic cycle of the traffic control system from the master controller in a novel and improved manner employing differential or compensating gearing in the intersection controllers.

Other objectives and features of my invention will be understood from the drawings and specification which follows.

The intersection controllers have four principal rotatable shafts. The first of these is motor driven and rotates in synchronism with and fixed phase relationship with a shaft at the master controller. This will be termed herein the synchronous shaft. The second shaft is driven from the first through suitable gearing, with an electrically operable clutch which can disengage the two shafts to establish a different phase relationship between them and, therefore, the offset of the signal operations. The third shaft includes a drum controller having six positions, said controller completing circuits to the signalling devices. This will be referred to as the drum controller. It is moved through its positions by a stepping magnet. The fourth shaft, termed the reset shaft, carries contact closing means and other elements. Certain of the contacts actuated by latter said means are in the conductors between the drum controller and the signalling devices whereby they may be dissociated. This shaft is operated through six positions by means of a stepping magnet.

Referring now to the drawings which comprise Figures 1 to 13, inclusive, I have shown, by means of conventional diagrams and drawings, the circuits and apparatus for carrying out my invention.

Figure 1 shows a front view of a controller panel employable in the intersection controllers.
Figure 2 is a top view of Figure 1 showing the controller panel, control contacts and the motors.
Figure 3 is a front view of Figure 1 with the front panel and many of the parts omitted. It indicates the relationship of the control contacts and the actuators therefor.
Figure 4 shows contact actuating keys which may be employed at the intersection controllers.
Figure 5 shows a combined motor and relay which I may employ.
Figures 6 and 7 show by conventions the apparatus and circuits of the master and intersection controllers, respectively.
Figure 8 indicates the type of traffic cycle which I have chosen to illustrate the operation of my invention, it being only one of a large number which may be provided.
Figure 9 shows arrangements whereby the signal operating circuits may be maintained closed during the resetting operation.
Figure 10 indicates by circuit conventions an alternative arrangement for producing current of predetermined frequency at the master controller.
Figure 11 indicates modification of the controllers for remotely controlling street or other lighting circuits.
Figures 12 and 13 show alternative differential means for period control, with the latter including circuit arrangements therefor.

Referring now to Figure 1, 101 is a front plate which is located in the housing of the intersection controller. Dial 102 is driven by a motor, as will be set out below, at the speed of one revolution per traffic cycle. The corresponding dials 102 at all intersection controllers will be driven in synchronism and definite phase relation with each other and the master controller. Dial 102 will be termed hereinafter the reset dial. Dial 103 is driven at the same speed as 102 by the same motor through suitable gearing and other means as will be described. Dial 103 may be made to operate at any one of a large number of phase relations with respect to dial 102. It controls the timing of the signal displays and will be referred to herein as the signal split dial. The phase relation of dial 103 to 102 determines the offset of the signal operations.

Dial 102 has three holes, preferably tapped, designated, respectively, Group 1, Group 2 and Group 3 by legend placed on the dial. A lever 104 extends from the center of the dial and has a knurled thumb screw 105 near its end, said screw being suitably located to cooperate with the three abovementioned holes. Lever 104 may be swung around and locked in any of the three positions, depending on the group of signals in which the particular intersection controller is to operate. While a knurled screw is shown, any suitable means for locking lever 104 in position may be used. Lever 104 controls, through a hollow shaft, internal mechanism as will be brought out.

Three slots to accommodate keys are also provided in dial 102, being designated on the surface of the dial as Special 1, 2 and 3. A key 109 is shown in slot 2. It is the purpose of a key or keys in these slots to effect operations of the controller in a manner different from that of its group as normally determined by the position of lever 104. This is for the purpose of effecting special resets as outlined above.

Dial 103 has two rows of slots with, say, 100 in each row, this number being arbitrarily chosen for illustration. These slots accommodate keys, those in the outer row controlling the timing of the individual signal displays and those in the inner row the operating or phase relation between dial 103 and dial 102 and, therefore, the signal offset. Five keys are shown in the outer slot on the assumption that six different signal displays will be required, although a greater or smaller number may be employed. Dial 103 has a disc 106 which is arranged to hold the keys in the slots in which they have been placed. A knurled thumb screw 107 is arranged to hold this disc and when a change of key positions is to be made, this thumb screw and the disc may be removed. The disc is of such diameter that the edges of the outer row of keys project slightly so that the positions of the keys may be ascertained without removing the disc. I may also provide slots in the disc through which the positions of the keys in the inner row of slots may be seen.

Dial 102 has a sector plate 108 to retain one or more keys 109 in predetermined position. This plate is pivoted and a spring 110 tends to maintain it against stop pin 111. When it is desired to change the position of key 109, the plate 108 may be rotated clockwise until it is clear of said key, so that the position of the latter may be changed. This key has three longitudinal positions in which it may be placed. It is shown in detail by Figure 4. The head of this key has two slots 401 and 402 in which sector 108 may be located to hold it. The sector also will hold the key in its third position, which corresponds to its maximum insertion in the dial.

A section 112 of dial 102 will be raised to accommodate the relatively long head of key 109. It will be understood that the face plate 101 will have circular openings back of each of the dials to give the keys access to the internal contacts and mechanism of the controller.

With reference to Figure 2, dial 102 is affixed to hollow shaft 201 and dial 103 to shaft 202. Shaft 201 is driven by bevel gear 203, which is a portion of a differential assembly comprising a companion bevel gear 204 and small bevel gears 205 pivoted to a ring gear 206 shown in section. Gear 204 is driven by self-starting synchronous motor 207 through speed reduction gearing 244. Ring gear 206 is driven by speed control motor 208 operating through worm 209 and other suitable gearing 245. It will be seen that if motor 208 is stopped and 207 is operating, shaft 201 will be rotated at the same speed as, but in the opposite direction from, gear 204. Also, if motor 208 is operating to rotate the ring gear relatively slowly in the same direction as 204, gear 203 and shaft 201 will be rotated at a slower speed than gear 204. Motor 208 is connected over trunk conductors to an adjustable frequency source at the master controller and will rotate at synchronous speed as determined by that source. Motor 208 is of the self-starting type. Variation of the speed of the latter motor is the means which I employ to control the total period of the cycle, as will be understood from what follows.

This arrangement enables a relatively powerful drive motor 207 operable from a local power source to furnish the power to rotate shaft 201 and associated rotary elements of the controller, with a second motor 208 of much smaller size and power consumption to control the speed of the controller shaft 201 and associated elements Examination of the differential action involved will disclose the fact that motor 207 tends to drive motor 208 in the direction which it revolves when connected to a suitable power source, but is prevented from so doing by virtue of the worm 209. or the equivalent. It follows, therefore, that motor 208 does not furnish driving power to the controller elements but, rather, permits thering gear to be revolved by the drive motor 207. Since this is a permissive or governor action it is necessary to furnish but little more power to motor 208 than required to overcome the friction of its bearings and gearing. It is contemplated that motors 207 and 208 will be of design similar to self-starting synchronous clock motors, but not necessarily so.

Bevel gear 203 is shown directly connected to shaft 201. It will be understood that I may provide one or more intermediate gears between 203 and shaft 201 so that I can readily change the relative speed of these two elements.

If the local power source should fail there would be a tendency for motor 208 to drive shaft 201 in a direction opposite to its normal rotation. Since motor 208 is contemplated as being relatively small it probably would, under this condition, merely stop due to overload. I have shown, however, pawl 237 suitably pivoted to bracket 238 which will engage the teeth of gear 210 to absolutely prevent retrograde movement and force motor 208 to stall. An obvious alternative to this arrangement would be to drive shaft 201 by means of a pawl so that if retrograde action of 203 occurs due to stoppage of motor 207, the pawl will disengage and prevent rotation of shaft 201.

Gear 210 on shaft 201 drives gear 211 on an intermediate shaft, said shaft having affixed to it clutch plate 212. An opposing plate slidably keyed to shaft 214 and having an armature 213 of magnetic material normally is forced into operative engagement with plate 212 by means of a spring, not shown, so that shaft 214 rotates at the same speed as gear 211. A magnet 215 is provided which, when energized, attracts armature 213 and the attached clutch plate out of engagement with 212 thereby stopping the rotation of shaft 214. The armature will encounter a pole face or faces of magnet 215 to hold shaft 214 stationary. While a direct magnetic operation of the plate by 213 is indicated, this is for illustration of the magnetic operation of a clutch, and any suitable means with appropriate linkages, if required, could be employed. A gear 216 is affixed to shaft 214 to drive gear 217 which is affixed to shaft 202. Gears 210, 211, 216 and 217 are designed to cause shaft 202 to be driven at the same speed as 201, and in the same direction.

Shaft 201 has affixed to it an arc sector 218. This arc sector has two contact actuators 219 and 220 mounted on it in such position as to operate contact springs 221 and 222, respectively. when said actuators are in their vertical positions. Contacts 221 comprise a group of three springs in the combination generally known as a transfer, and is for the purpose of effecting circuit changes incident to maintaining the intersection controller in synchronism and fixed phase relation with the master controller.

Actuator 220 cooperates with contact spring assembly 222 to open a normally closed pair of contacts a short interval after 219 has released contacts 221. This controls a circuit to clutch magnet 215 to establish and maintain a predetermined operating relationship of shaft 202 to shaft 201.

Key 109 has a projection or shoulder 223 on its shank to form a contact actuator for contact springs 224, 225 or 226. This key can occupy any of three longitudinal positions, depending on which of three particular signal operations is desired, and will close one of the latter contacts when it is rotated to the vertical position, the particular one depending upon the longitudinal position of the key. It also will be seen by Figure 1 that this key may be removed from slot 2 and inserted in either of the other two associated slots giving further flexibility of control as will be understood. This key is shown in detail by Figure 4.

The keys 250 in the outer row of slots of dial 103 actuate contacts 231 by shoulders 249 thereon. The design of such keys is also shown by Figure 4. Keys 250 are held in alignment by disc 236, which is affixed to shaft 202 and which has slots corresponding to those of dial 103. On the basis of a six element traffic cycle, five keys similar to 250 are employed, as stated. They actuate contacts 231 at times during the cycle depending on the slots in which they have been inserted, and each time said contacts are closed and opened, the signal drum controller is advanced to the next one of its six positions. Contacts 232 control the advance of the signal drum to its first position, thereby assuring that said drum and dial 103 maintain the proper operating relation. These contacts are closed by actuator 246 which is affixed to disc 236 in the position of the slot indicated by 0 on dial 103. The latter slot is actually omitted.

Keys such as 251 are arranged to be inserted in the inner slots of dial 103, and are held in alignment by corresponding slots in discs 236 and 247 on shaft 202. These actuate contacts 233, 234 and 235 at times during the rotation of dial 103 depending on the slots in which they have been placed. These contacts control circuits through contacts engageable by a wiper on the reset shaft, said circuits extending through the clutch magnet 215 and contacts 222 to determine the offset or phase relation between shafts 201 and 202 for the three resets in which the signals may normally be operated. Each key 251 has a contact actuator at a different position along its length to cooperate with the contacts to be actuated. Key 251 to actuate contacts 233 is shown by Figure 4. The actuator for the other two keys are indicated, 403 closing contacts 234 and 404 closing contacts 235.

Lever 104 is affixed to a shaft extending through a portion of hollow shaft 201. The latter shaft has a slot 227 cut for a substantial portion of its circumference. The internal shaft has affixed to it a pair of wipers 228 to cooperate with an arc of six contacts, the top one of which is designated 229, and a circuit feed ring 230. When the wipers are on a particular contact, a circuit is extended from the feed ring, through the wipers to the contact. The wipers are insulated from shaft 201.

The relationship of the contact actuators, the keys and the wipers may be understood better by reference to Figure 3. This figure is a front view of the assembly of Figure 2, with the front plate, dials and other apparatus omitted to simplify the description. It will be seen that as shaft 201 rotates, wipers 228 will complete circuits from the ring 230 to contacts 229, 301 to 305, inclusive, in order. It also is apparent that the particular part of the rotation of dial 102 in which said circuit completion occurs will depend upon the position of lever 104. All of the signals comprising group 1, as determined by the position of lever 104, will have a partial circuit completed through contact 229 at the same time, and subsequently in order, through 301 to 305, inclusive. Those signals comprising group 2 will have the same order of contact closure but at a different part of the rotation of dial 102; and those in group 3 at a third part. Wiper 228 and its associated arc of contacts controls the reset in which the signal system operates. Broadly viewed, it comprises a selector. Means which will be described provides for extension of current through ring 230 under control from the master controller at a particular time during the rotation of dial 102, so that if this occurs when the wipers are on one of the contacts in the arc, this circuit will effect control functions to result in the intersection controller being reset for a particular operation. Since the wipers of the three groups occupy different angular positions with respect to each other and the contact arcs, it follows that the three groups may be independently reset from the master controller.

A serrated disc 239 is provided to cooperate with a pair of contacts 240, whereby these contacts are opened and closed. This provides a flashing circuit which I employ in providing certain flashing signals in the operation of the system. It will be apparent that the frequency of this flashing operation will vary with the speed of shaft 201. I may elect to place this serrated disc on shaft 241 which is driven at a constant speed, and suitably relocate contacts 240, which would eliminate this frequency variation.

The several contact assemblies are mounted on a block 242 of suitable insulating material with the springs of the contacts terminating in screws for attaching conductors thereto. Contact assemblies 233, 234 and 235 are closer to shaft 202 than 231 and 232, so the block has a lowered section 243 to accommodate them at the proper height. The circuit operation permits one spring of assemblies 224, 225 and 226 to be connected together, and also one of 233, 234 and 235. This is shown provided for by making said springs out of a single stamping, requiring but one external circuit connector for them.

Master controller circuit and apparatus which I may employ are shown by Figure 6. A local source of alternating current power is connected to terminals 601 and 602, with a main switch 603 in the conductor connected to 601. An adjustable speed motor 604 with suitable means, not shown, to control the speed thereof, drives an alternating current generator indicated by slip rings 605 and and field coil 606. The voltage of this generator is controlled by variable resistance 607 connected in series with battery 608 and the field coil. It is the purpose of this field current control to provide for an appropriate voltage to be produced for different speeds of the generator. It is the purpose of this generator to produce a variable frequency potential to control the speed of the intersection controllers and therefore the length of the total signal cycle.

The circuit from the terminal 602, which preferably is connected to the grounded side of the supply circuit, is extended to the various intersection controllers over a trunk conductor CR which serves as a common return.

A drive motor is indicated by 609 with a speed control motor 610, which are of the synchronous type and may be of the same designs as the corresponding ones 207 and 208 of the intersection controllers. These cooperate through a differential arrangement such as shown by Figure 2 to drive at an adjustable speed a main shaft to which are affixed dials, or the equivalent, 611, 612 and 619. The drive motor 609 is normally connected through switch 613 to the two power leads, so is driven at synchronous speed thereby. The speed control motor 610 is connected across the alternator circuit. It is therefore driven at a speed corresponding to the frequency of said alternator. The lead from the blade of switch 614 extends through switch 618 and thence to the various intersection controllers over trunk conductor RS, over which is controlled the resynchronization of the intersection controllers and also the speed of the speed control motors thereat, and consequently the total period of the signal cycle.

The third dial 619 has a contact actuator 620 which briefly opens contacts 617 once each revolution establishing a resynchronizing point for the intersection controllers. These contacts are connected in a circuit which may be traced from trunk conductor CR, said contacts, alternator 605, switch 614, switch 618 to trunk conductor RS to the intersection controllers. Since dial 611 revolves once each traffic cycle, it follows that once each cycle the circuit through conductor RS is interrupted. It will be understood that a dial with an actuator 620 is illustrative of the required operation, and several alternative forms may be employed to effect the momentary opening of contacts 617 each cycle.

Dial 611 carries three adjustable contact actuators 621, 622 and 623. Each corresponds to a group of intersection controllers and each has six holes to which it may be manually positioned and locked. While any suitable locking means may be employed, one simple means I may use would comprise knurled thumb screws cooperating with the holes which may be tapped.

The actuators are arranged to cooperate with contacts 624 in such manner that said contacts are opened by each of said actuators each revolution of dial 611; i. e., once each cycle by each actuator. The particular times during the cycle depend upon the position of the actuators which, in turn, depends upon the holes in which they are locked. The holes are located in three quadrants of the dial and are spaced within the quadrant in the same angular relationship as the arc contacts 229, 301—305 of the intersection controllers. It will be recalled that wipers 228 move successively across these contacts. These wipers are shown in Figure 3 to be set for group 2 and associated with contact 229. If actuator 622 is in the first hole, contacts 624 will be opened while the wipers are in this position. If the actuator 622 is positioned in the second hole, as shown, contacts 624 will be opened when the wipers at the intersection controllers of group 2 are associated with arc contact 301. In brief, the contacts 624 may be selectively opened by appropriately positioning actuator 622 when the wipers of the group 2 intersection controllers are associated with any of the arc contacts. In a similar manner, actuator 621 may be made to open contacts 624 when the wipers of group 1 intersection controllers are associated with any of their contacts, and actuator 623 may likewise coordinate the opening of contacts 624 with the effective positions of wipers of group 3 controllers. This provides, in its essentials, a synchronous distributor system with the distant distributor establishing partially completed circuits in order to a series of successive contact terminals, permitting control operations to be selectively effected from the master controller by providing a current condition over the interconnecting trunk circuits while the distant distributor is associated with a particular terminal.

Contacts 624 are provided with a normally closed shunting switch 625. With the latter switch open a circuit may be traced from power terminal 601, switch 603, contacts 624, contacts 626 and shunting switch 627, assumed to be closed, switch 628 over trunk conductor SET to the intersection controllers. When each of the actuators strikes contacts 624, the above described circuit over conductor SET is interrupted. At the intersection controllers, a relay or the equivalent, is connected to this trunk conductor, and is released when the circuit thereover is interrupted. This relay extends a local circuit to the ring 230 and, since the wipers of the three groups of controllers bear a different phase relation to each other, each of the three groups will get a partially completed circuit through their wipers at different times during the cycle, the particular times depending on the position of the actuators 621, 622 and 623, as brought out above.

Dial 612 is for the purpose of effecting special resets at all intersection controllers provided with a key 109 in the reset dial 102. It is provided with a contact actuator 629 which may occupy three positions as indicated by the three holes in the dial. It may open contacts 626 at any of three times during the cycle, depending on its position. These contacts are normally shunted by switch 627. If the latter is opened the above described circuit over conductor SET will be interrupted by the opening of contacts 626. The time of opening of these contacts, depending upon the position of the actuator, corresponds to the possible times of closure at the intersection controllers of contacts 224, 225 or 226 by key 109 in one of its three slots. The latter contacts select the special reset to be made effective.

Switches 625 and 627 are provided to shunt their corresponding contacts 624 and 626 so that normally the actuation of the latter are not effective. When a new group reset is to be effected, shunting switch 625 may be opened until the proper actuator or actuators which have been shifted have opened and closed contacts 624. Likewise, a special reset may be effected by opening switch 627 until contacts 626 have been opened and closed. While all of the signals are operating under group control, switch 625 may be allowed to remain open. It will be appropriate to maintain this switch closed when a special reset is effective so that the intersection controllers will not return to operation in their normal group when the group actuators open contacts 624.

It will be understood that there are many alternative structural arrangements to effect the above described master controller operations. One arrangement would be to provide a separate dial for each group actuator with contacts and a shunting switch. An extension of this would be to have each of these dials with a clutch so that when a change of reset is to be effected and an actuator has been shifted, this clutch will cause the corresponding dial to make one revolution in proper phase relation and stop. This would dispense with the need for a shunting switch. It is also apparent that actuator 629 may be mounted on dial 611, thereby dispensing with its contacts and their shunting switch. Likewise, a bank of contacts and wipers with switches associated with each contact may be used in a manner generally similar to that disclosed in my above mentioned patent.

The operation of the master controller will be described further in conjunction with the operation of the intersection controller.

Circuit arrangements and apparatus of an intersection controller are shown by conventions in Figure 7. This controller has four rotary contact actuating shafts, as stated, the first of which is the synchronous shaft 201 (Figure 2). The contact actuators and/or contacts actuated by this shaft will be commonly indicated by S in addition to specific numerical reference.

The second shaft is 202 (Figure 2), which drives the signal split dial, and the elements associated with it will be commonly indicated by SS, as well as specific numerical designation.

The third or drum controller shaft has the elements associated directly with it commonly indicated by D. It is stepped through its six positions by the operation and release of magnet 701.

The fourth shaft controls the reset in which the controller operates, and the elements associated with it will be commonly designated R. It is operated by stepping magnet 702 which, in turn, is normally operated under control of the wipers 228 and their associated arc of contacts, or special reset contacts 224, 225 and 226, and impulses resulting from the momentary opening of the circuit through conductor SET at the master controller.

The contact actuators for certain of the contacts are not shown but their closure is indicated by the numerical designation beside the contacts. For example, the "3" shown by the contact of 731 indicates that this contact is closed in position 3 of the drum controller D. Likewise, the designation ⁶⁄₃ shown beside contact 736 indicates that this contact is closed continuously for positions six through three of the drum controller.

The arrangement for driving the intersection controller and maintaining it in synchronism with the master controller will now be considered. The synchronous drive motor 207 is normally connected to alternating current from a suitable source supplied over conductors 703 and 704, said motor circuit extending through normally closed contacts 221, so said motor operates at synchronous speed depending on the frequency of the supply. The speed control motor 208 is connected to trunk conductors RS and CR, the former being supplied by a predetermined frequency from alternator 605, or the equivalent, so said motor revolves at synchronous speed determined by said frequency. By means of the differential previously described, the synchronous shaft S revolves at a predetermined speed to establish the period of the total signal cycle.

Once each cycle at the synchronizing point contact actuator 219 transfers the circuit for motor 207 from the normally closed contacts of 221 to the open ones. It will be seen, therefore, that if the circuit to the latter contacts is open, the motor will stop in his position. A relay 705 is connected in multiple with speed control motor 208. A relay 706 is connected from reset trunk conductor SET to the common return conductor CR. It will be recalled that once each cycle at the synchronizing point the circuit from the alternator 605 through RS is interrupted by contacts 617, to result in the momentary release of relay 705. With relay 705 released and 706 operated, a circuit can be traced from power conductor 703, the back contact of relay 705, the front contact of relay 706 to the normally open but now closed contact of 221 through the motor winding 207 to power conductor 704. It will be seen that if relay 705 is released at the same instant that the circuit through contacts of 221 is transferred, drive motor 207 will not stop.

If the circuit through contacts 221 is transferred before relay 705 is released, the intersection controller will stop and remain in this position until this relay is released, whereupon it will start in synchronism with the master controller shaft. Resynchronization occurs, therefore, each cycle.

It will be noted that the circuit to speed control motor 208 is opened simultaneously with the release of 705, which results in said motor either stopping or tending to stop, to result in a slight momentary acceleration of the rotation of the synchronous shaft if the intersection controller is in synchronism. This makes the latter controller tend to move ahead of true synchronism, but if it advances more than a tolerable amount, this advance is corrected when the synchronizing point is again reached. It is desirable for the controller to tend to be slightly ahead rather than behind synchronism, since the latter would result in the controller stopping for a whole cycle whereas under the former condition it would stop only momentarily.

It will be observed that if, for any reason, the controller should get slightly behind synchronism whereby motor 208 is stopped before contacts 221 are actuated, the resulting acceleration will tend to restore the synchronous condition and if the lag is small, this condition will be obtained without stopping the controller.

The means for operating the signalling devices now will be considered. These devices may be of any suitable form or design to give indications to control the flow of traffic. For illustration, signals comprising a housing 707 facing the main street traffic and 708 facing the side street, each with red, amber and green signalling indicators comprising colored electric lamps or white lamps with colored lenses, have been shown. It will be understood that one or more additional signal lamp assemblies may be connected in multiple with those shown to give displays in other appropriate directions. An electrically operated directing arrow 709 is shown to be illustrative of various supplemental signals and/or signs which may be employed to control the flow of traffic. One terminal of each of the signal and arrow lamps is connected to power conductor 704, and the other terminals extend, respectively, to contactors 740 to 746, inclusive.

In the preferred embodiment of my invention, two cam wheels 710 and 711 are affixed to the reset shaft R. These present cam faces to cam followers 712 and 713, respectively, which serve as actuators for contactors 743—746 and 740—742, respectively. These actuators are normally sprung toward their cam wheels. These contactors may occupy three positions as controlled by their cam wheels, the raised position, as shown, which prevails for positions 4, 5 and 6, closes circuits through the respective upper contacts; the intermediate position results in all circuits through these contactors being opened; the lower position resulting in the respective lower contacts being closed. With the reset shaft in position 4, 5 or 6, obvious circuits extend from the upper contacts of 740—746 to contactors 731—737 of the drum controller and thence to power conductor 703, for certain designated positions of said controller.

The closure of the latter contactors for various positions of the drum controller is indicated beside the associated contacts. For example, the arrow is lighted while the controller is in position 3 as effected by contactor 731; the main amber lamp in position 2 as controlled by contactor 732, and so on. The relation of the closure of the drum controller contactors to the signal cycle; i. e., the sequence of the signal displays, is shown by Figure 8. The latter indicates the signal displays to each direction of traffic for each position of the drum controller, but not the period of each since this is adjustable. For example, in position 1, the main street green and side street red signals are displayed, which also is indicated in Figure 7 by the fact that the circuits thereto are closed in position 1 by contactors 735 and 736, respectively. The contactors actuated for the other five of the six elements of the cycle shown by Figure 8 may similarly be noted on Figure 7.

In position 2 of the reset shaft, which results in lighting the red lamps in both directions, it will be seen that all contacts controlled by cam wheel 711 will be opened. Cam follower 712 will be at the shorter radius of cam 710 which results in lower contacts of 743 and 745 being closed to complete obvious circuits to both red lamps.

In position 3, all contacts associated with cam wheel 710 will be open, but the lower contacts associated with wheel 711 will be closed. This will complete circuits from power terminal 703, contacts 240, closed contacts 741 and 742 to the two amber lamps. It will be recalled that contacts 240 are opened and closed by serrated disc 239, so the amber lamps will be flashed.

It will be understood that the particular operations set out for the several positions of the reset shaft have been arbitrarily chosen for purposes of description. A large number of others may be used. For example, by connection of the lower contacts of 743 and 745 to the flasher contacts 240 instead of directly to power conductor 703, I may provide flashing red lamps for reset 2. It also follows that by connecting the lower contacts of 741 and 742 directly to conductor 703, instead of through contacts 240, continuously displayed amber lamps may be provided for reset position 3. Other combinations of signal conditions may be provided. In practicing my invention I may provide lower as well as upper contacts for all of contactors 740—746, with cross-connecting facilities for interconnecting them to the flasher contacts or to conductor 703, as desired. As an extension of this principle I may provide other contactors such as 740—746 which may be connected on the right to any of the lamp circuits, including arrows or display signs, and on the left either to power conductor 703, the flasher contacts 240 or to additional contactors on the drum controller to permit substantially any signal display or combination thereof for any of the resets.

The drum controller is stepped by magnet 701 which has a pawl to actuate a ratchet wheel on the shaft of the controller. When this magnet is energized, its pawl is positioned and when the operating circuit is opened a spring causes the armature and pawl to be retracted and the ratchet wheel and controller shaft to be advanced one position, i. e. one-sixth of a revolution. One side of the winding of 701 is connected to power conductor 704 and the other through upper contacts of switch 720 to contactor 738 on the drum controller shaft, said contactor having two contacts, the lower one being closed when said shaft is in positions one through five, inclusive, and the upper in position 6, as indicated. Circuit from the former contact extends to contacts 231 on the signal split shaft to be operated by the five keys similar to 250 (Figure 4) in the outer row of slots of the signal split dial 103. Contacts 232 are operated by actuator 246. It will be seen that during the rotation of the signal split dial, magnet 701 will have a circuit completed and interrupted from power conductor 703 five times by contacts 231 and once by contacts 232. If the drum controller gets out of proper operating relationship with respect to the signal split dial it will stop in position 6, due to the opening of the lower contacts of 738, until contacts 232 are closed and opened. This assures maintenance of the proper operating relationship between this controller and the signal split dial.

The actuator 246 controls the beginning of the cycle. Inasmuch as the keys 250 may be placed in any of the outer slots in the signal split dial 103 and this dial rotates at uniform speed, it follows that the signal cycle may be divided up between the several signal elements in practically any desired manner.

It is to be understood that the type of signal cycle shown by Figure 8 is merely for illustration and any one of a variety of others may be employed. The sequence and/or overlap of the various signal displays may be widely varied by changing the actuators for contactors 731—737 to control the lamp circuits in the desired manner. A greater or smaller number of signal elements per cycle may be employed by arranging the drum controller to have a corresponding number of positions and to correspondingly employ a greater or smaller number of keys similar to 250 in the signal split dial. In practicing my invention I probably will elect to employ controllers with six positions of the drum controller as shown, since the types of cycles in use generaly are restricted to not more than six elements. Where it is desired to have cycles with a smaller number of elements per cycle, I will arrange the drum controller to repeat the same contactor actuations in one or more successive positions to reduce the number of effective elements in the signal cycle as required. Certain keys of the five in the outer row of the signal split dial would be employed to effect passage of the drum controller through the repeated positions.

The drum controller may be so designed, as is well known to the art, that the contact actuation may be adjustable so that any combination of signal lamps may be operated for any position of the controller, in order to facilitate changing the type of cycle.

It will be obvious that I may have other cam wheels such as 710 and 711 on the reset shaft and other drum controller contactors such as 731—737 corresponding thereto whereby one signal controller will operate two or more groups of signals with entirely different times of signal displays within the cycle and/or types of cycle. Such an arrangement would be desirable where complex intersections are involved and several traffic routes are independently controlled. Likewise, I may have several arrows or other informative displays which will be operative for various resets, either steadily or flashing, and/or at particular times during the cycle.

Resetting the controllers now will be described. The controller chosen for illustration provides for six resets as follows:

Reset 1—off
Reset 2—red in all directions
Reset 3—flashing amber in all directions
Reset 4—offset #1
Reset 5—offset #2
Reset 6—offset #3

The reset drum is shown in position 4 for the signals to be operated in offset #1. As explained above in connection with Figure 2, clutch magnet 215 is arranged to stop the rotation of the signal split dial when it is operated. It is apparent from what has been set out above that for a fixed position of the keys in the outer slots of the signal split dial 103 the offset is determined by the phase relation between this dial and dial 102 on shaft 201, which is controlled by the clutch magnet 215 cooperating through circuits with certain contactors on both the synchronous and reset shaft, as will now be described.

Clutch magnet 215 is connected on one side to power conductor 704 and on the other to a wiper 717 on the reset shaft, said wiper extending circuits to an arc of three contacts 714, 715 and 716 depending on whether said shaft is in reset positions 4, 5 or 6, it being shown in position 4. The circuit from clutch magnet 215 is shown extended to contacts 233. These contacts are closed by key 251 inserted in the inner row of slots of the signal split dial 103, and when they are closed the above mentioned circuit is extended to normally closed contacts 222 associated with the synchronous shaft and thence to power conductor 703. The latter contacts are opened momentarily once each revolution of the synchronous shaft 201. If the signal split shaft and dial are rotating in proper phase relationship, contacts 222 will be opened simultaneously with or slightly before the closure of contacts 233, so the clutch magnet will not be operated. Let it be assumed that wiper 717 is moved to position 5, by means to be described, so that the clutch magnet circuit is extended to contacts 234, said contacts being actuated by key 251 with an actuating shoulder 403 (Figure 4) which is located in a desired one of the slots in the inner row of the signal split dial. When these contacts are closed, the clutch will be operated to stop the rotation of the latter dial and this condition will be maintained until contacts 222 are opened. It will be seen that the signal split dial will now operate in a new phase relation with respect to the reset dial, said relation being determined by the slot in which the last mentioned key is located. Likewise, a third offset may be established by moving the reset shaft to position 6 and having key 251, with an actuating shoulder 404 (Figure 4), in the position for the desired offset. Any desired offset may be provided for each of the resets by appropriate positioning of keys 251. If I desire to have exactly the same offset for two different resets, I may provide a key 251 with two actuating shoulders.

The reset shaft is advanced through each of its six positions by stepping magnet 702, said magnet having a pawl cooperating with a ratchet wheel on said shaft to advance the wheel and shaft one-sixth of a revolution when said magnet is released. This magnet has self-interrupting contacts connected to power conductor 704, so that if the other power conductor is connected to its winding said magnet will operate and release repeatedly rotating the reset shaft.

The winding is connected to a commentator wheel 718 or the equivalent on the reset shaft, said wheel having an insulated segment 719. Six brushes cooperate with said wheel in designated positions corresponding to the location of the insulated segment when the wheel is in the several reset positions. The reset shaft is shown in position 4 and this brush is connected to arc contact 303, and the other brushes are connected in order to arc contacts 304, 305, 229, 301 and 302. Wipers 228 cooperate with these arc contacts to successively connect them to arc segment 230 which is connected through switch 721 to the back contact of relay 706 and, if this relay is released, to the front contact of relay 705 which, if operated, will extend the circuit to power conductor 703.

Relay 706 is connected to trunk conductor SET, the circuit through which may be interrupted by the master controller at particular times during the cycle to release said relay. Let it be assumed that wipers 228 are associated with arc contact 303 when relay 706 is released. Since insulated segment 719 is under the brush connected to this arc contact, magnet 702 remains unoperated. Let it be assumed now that relay 706 is released with wiper 228 associated with arc contact 302. Under this condition magnet 702 will get a completed circuit and will operate and release repeatedly, rotating the reset shaft and wheel 718 to where the insulated segment 719 is under the brush corresponding to position 3 of this shaft, said brush being connected to arc segment 302. The operating circuit for 702 is, therefore, interrupted in this position and the reset shaft will stop in position 3. It will be seen that the reset shaft may be moved to any position by releasing relay 706 when wipers 228 are associated with the corresponding arc contact.

It will be recalled that the circuit through conductor SET may be opened at predetermined times during the cycle by actuators 621, 622 and 623 of the master controller, depending upon the hole in which the actuators are positioned. Let it be assumed that the particular controller is operating in group 2. As pointed out above, wipers 228 successively establish partial circuits to the six arc contacts in order. At the same time the holes in dial 611 successively pass the associated contacts 624. To effect reset #6, for illustration, it is necessary that the actuator 622 be located in hole #6 and switch 625 opened, which will result in relay 706 being released while wipers 228 are on arc contact 305 to cause the reset shaft to be revolved to that position, if it is not already there. Likewise, any other reset can be established for this particular intersection controller and the others in its group by moving actuator 622 to the desired position and opening switch 625 until the actuator passes the contacts.

A magnet arrangement 702 such as shown, with self-interrupting contacts, can be arranged to operate and release very rapidly. It is contemplated that the speed of this operation will be in the general order of ten steps per second, so that the maximum movement of the reset shaft through five steps can be effected in about half a second. This interval plus an appropriate margin governs the time the circuit through conductor SET is interrupted by the master controller for resetting.

It will be recalled that lever 104 (Figure 1) determines, by its position, which group the signals at its controller will operate in. The wipers of controllers in groups 1 and 3 will not be effected by reset operations of group 2 since wipers 228 of the other groups will not be engaging their arc contacts when relays 706 thereat are released. This permits the independent reset from the master controller of any of the three groups of intersection controllers by appropriate positioning of their corresponding contact actuators on the dial 611 and opening the associated shunting switch 625. The facility with which lever 104 of the intersection controller may be operated to adjust the relative position of the wiper 228 thereat provides ready means for changing a controller from one group to another.

Three special resets are provided as controlled by key 109 inserted in one of the three special reset slots of the reset dial 102, whereby contacts 224, 225 or 226 may be closed selectively, depending upon the distance said key is inserted. As will be seen by Figure 7, one contact of each pair is connected together and to the conductor extending through switch 721 to the back contact of reset relay 706, so these contacts are energized each time this relay is released for resetting. It will be recalled that the actuating keys for these three contacts are so positioned that they may be closed at times different from those in which any of the wipers 228 of the three groups may engage their arc contacts.

Special reset dial 612 is provided at the master controller, with contacts and actuator 629, which may be positioned in any of three holes corresponding to the three special resets at the intersection controllers. If it is positioned in hole 1 as shown, and switch 627 is opened, the circuit through trunk conductor SET will be interrupted momentarily with all of the intersection controllers in such position that if key 109 is in special reset slot 1, it will cause the closure of one of contacts 224, 225 or 226. Let it be assumed that key 109 is in its minimum distance in the slot and relay 706 is released just as the associated key contacts 226 are closed by said key. This will result in a circuit extending from power conductor 703, front contact of operated relay 705, back contact of relay 706, switch 721, closed contacts 226, the brush corresponding to position 3 of commutator wheel 718, said wheel, stepping magnet 702, its contacts to power conductor 704. This magnet will operate and release repeatedly to drive the reset shaft to position 3, where it will stop. This position results in all of the amber signal lamps associated with this controller flashing and it follows that this same situation will prevail at all intersection controllers of the system having a key similarly placed in the first special reset slot, and all will be so reset simultaneously, irrespective of what group they normally operate in.

Contacts 225 are shown connected to the brush of wheel 718 to cause it to be moved to reset position 2 (all red indication) if relay 706 is released while said contacts are closed; and likewise contacts 224 control the movement of the reset shaft to reset position 1 (all lamps extinguished). From what has gone before, it will be seen that all, or any particular ones of the signals of the system, may be simultaneously reset to any one of the three special resets, i. e. resets 1, 2 or 3, by appropriately positioning keys 109 in the proper slots of the reset dials of corresponding controllers.

Key 109 is designed to close either contacts 224, 225 or 226, depending upon the distance in which it is inserted, for the purpose of permitting various signals of the system to be changed simultaneously to different resets. It will be apparent that special reset conditions can be established at particular intersections without disturbing the operation of the signals at the other intersections of the system.

A particular intersection may carry a key in each of the special reset slots positioned as desired whereby said controller will be selectively responsive to three different special reset operations.

In practicing my invention I may provide ready means for interconnecting contacts 224, 225 and 226, and also arc contacts 229, 301—305, with any of the brushes on wheel 718 at any intersection controller so that the reset shaft thereat may be correspondingly positioned for resetting, as a further illustration of the flexibility of application of my invention.

It may be desirable to discontinue particular intersection controllers from centralized control and operate them manually by traffic officers. Switches 720 and 721 are provided, which may be operated by a common manual lever. The former transfers the circuit for stopping magnet 701 from contactor 733 to switch 722, and the latter opens the reset lead from the back contact of 706 to the arc contact feed ring 230 and special reset contacts 224, 225 and 226, thereby preventing reset of the controller from the master controller during manual operation. Manual operation and release of switch 722 will cause the drum controller to advance one step, and repetition of this will cause the signals to operate through their cycle with the period of each element thereof determined by the officer. In practicing my invention I may provide for switch 722 to appear as a push button on the side of the controller or as a "squeeze" switch on a flexible cord or in some other suitable and convenient form. It will be seen that it will be necessary for the reset shaft to be in positions 4, 5 or 6 when manual control is being effected, and I may provide a switch and contacts which, when operated, will extend a circuit from power conductor 703 to brush 4 of wheel 718, for example, to cause the rotation of the reset shaft to position 4. An alternative which I may use will be to provide a push button switch which will energize magnet 702 in such manner as to cause the reset shaft to be advanced one step upon each actuation thereof. An indicator on the reset shaft will permit the officer to observe and advance the reset shaft to the desired position, and when the controller is returned to centralized control, the reset shaft may be returned to the position from which it was moved. A third alternative would be to provide said shaft with a hand wheel to rotate it manually.

My invention includes provisions for remote shutdown. The signals may be extinguished by resetting all controllers to reset position 1 and leaving the motors running. This generally would suffice in practice and is employed with other systems currently used. I may, however, shut down my system completely, including stopping the motors, and this will now be described. Assume that the signals are operating in the fourth reset, as shown. The first step will be to reset the controllers in all groups to the reset position 1 (off) by appropriate adjustment of the actuators on the group dial of the master controller, or this could be effected by the operation of the actuator of the special reset dial thereat if all controllers are arranged for resetting to the first reset as a special reset by appropriate location of key 109 at all of the intersection controllers. Contactor 747 is opened in this position. The next step after the off reset has been established will be to operate switch 613—614 at the master controller (Figure 6). The former will transfer the circuit for the drive motor 609 from power conductor 602 to this conductor via contacts 617. When dial 619 reaches its contact actuating position, the circuit to motor 609 will be interrupted and the master controller will stop. Switch 614 transfers trunk conductor RS from the alternator to power terminal 601, so that the opening of contacts 617 will not result in the circuit through RS being interrupted. At the intersection controller, the actuator 219 will transfer contacts 221 at the synchronizing position. It will be recalled and seen that the drive motor 207 will be stopped in this position inasmuch as relay 705 is held operated by the circuit over conductor RS. When this has had time to take place, switch 628 may be opened interrupting the circuit over conductor SET, thereby releasing relay 706 at all intersection controllers. This will not cause a reset operation to take place since the reset circuits are not susceptive of completion with the synchronous shaft in the synchronizing position. Release of relay 706 will open the circuit between the back contact of 705 and the upper contact of 221. Switch 618 may now be opened to release relay 705 without restarting the intersection motor. Master switch 603 may now be opened stopping the alternator and the speed control motor 610, and the entire system will be shut down without a relay or motor being operated or a signal lamp being lighted.

To start the system, this series of operations may be reversed. First, switch 603 will be closed to energize the master controller and 618 closed to operate relay 705 at the several intersection controllers. Switch 628 will then be closed to operate relay 706 at the controllers. Switch 613—614 will then be restored to the position shown to start the master controller motor and to momentarily release relays 705 at the intersection controllers, since contacts 617 will be open at this instant, to start the intersection controller motors. The contact actuators on the several group dials may then be moved to effect the desired resets. It probably would be desirable in starting the system to reset it to flashing amber as a warning before stop-go control is effected, and this obviously may be done by proper positioning of the actuators on the group dial 611.

In the event of failure of the power supply at the master controller or failure of the trunk conductors, relays 705 and 706 will be released. If this occurs in any reset except the first, which opens all of the signal lamp circuits, the main drive motor 207 will continue to operate to maintain the operation of the signals inasmuch as contacts 747 will be closed to extend power from conductor 703 to the upper contacts of 221 while the latter are closed at the resynchronizing point. The speed control motor 208 will stop, which will result in the period of the signal cycle being reduced somewhat under the minimum of normal operation. This shortening of the cycle may be prevented by providing additional contacts on relays 705 and 706 so that when both of these relays release the speed control motor will be disconnected from the trunk conductors and connected to the local power supply unless the reset drum is in position 1 (off), which requires that the local power supply circuit for this motor extend through contacts associated with the reset drum which will be closed for positions 2/6 thereof. This will make desirable that the frequency band chosen for period control include the frequency of local power supply to the controllers.

A motor 208 and a relay 705 are shown in Figure 7 to be connected in multiple. In practicing my invention I may elect, in point of economy, to combine these two elements in a single structure employing a single winding. Such an arrangement is shown by Figure 5. Coil 501 is provided on laminated core 502. A second core 503 is also provided toward completing the magnetic circuit. These core elements are formed on the left into pole faces, with an amortisseur winding 504 around a portion of one or both of them. A rotor 505 is provided within the arc of the pole faces and last said winding will make it self starting. This rotor could be a rotary vane such as used in clock motors of familiar type known to the trade as the "Telechron" type, which revolves in synchronism with the rotating magnetic field set up in the core.

At the right end of the assembly is shown a laminated armature 506 pivoted at 507. Bracket 508 forms an actuator for contact spring assembly 509. In the normal position shown, a circuit is completed from the upper fixed spring through the middle or moveable one. The contact springs terminate on the left in soldering lugs or other suitable connector means.

If the coil 501 is connected to a source of alternating current of appropriate voltage and within suitable frequency limits, armature 506 will be attracted which will transfer the circuit of the moveable spring from the upper to the lower fixed contact spring. The armature element 505 will immediately start to rotating at synchronous speed.

It will be seen that this arrangement may be substituted for the speed control motor 208 and relay 705 with minor changes in the associated structural parts of the controller. It also will be obvious that other contact assemblies than the one shown may be employed if I should elect.

The circuit and apparatus shown by Figure 7 might result in a flicker of the signal lamps during transition of the reset shaft from, say, reset six to reset four which arises from the fact that cam wheels 710 and 711 must pass through the off, flashing amber and all red positions to reach it. While this would be very rapid, probably comprising only a fraction of a second, and generally would not be objectionable, it may be obviated and arrangements for effecting this are shown by Figure 9.

Cam wheel 711, which is mounted on the reset shaft as will be recalled, is representative of wheel 710, as well, and also of other similar wheels on said shaft for controlling the signal lamp circuits where more than one signal group is operated by one controller. Cam following wheel 713 is suitable mounted on lever 901 which is appropriately pivoted to frame member 902. Spring 903 tends to pull the follower toward the cam wheel. The latter wheel has an insulated spring stud 904 attached to it, said stud having moveable contact springs 740, 741 and 742 extending through slots in it. In the position of the wheel shown, the right hand fixed springs are in contact with their respective moveable springs. When the wheel is in position 3, circuits are completed through the left hand fixed contact springs and in positions 1 and 2, the circuits are open through all of said contacts as required for the operation of this wheel. A similar condition as appropriate for the necessary circuit operation would prevail with wheels similar to 710 on this shaft.

The contact springs at their lower ends are fanned out with conductor connecting facilities, preferably screw terminals on a terminal block, as shown.

An electromagnetic relay arrangement is provided, including coil 706, core 905 and pivoted armature 906. A bracket 907 attached to the armature carries a contact spring actuator 908, and the end of said bracket is pulled counter clockwise by spring 909, which tends to maintain armature 906 in its open position, as shown. A spring assembly comprising normally open contacts 910 and normally closed contacts 911 is provided for actuation by 908. The upper ends of the contact springs terminate in soldering lugs or other suitable connector means. This assembly is proposed as a substitute for relay 706 of Figure 7 and since the coil thereof is connected identically with that of said relay, the same designation has been used. Likewise, the contacts 910 and 911 correspond to the contacts of said relay which are open and closed, respectively, when said relay is in its released position. As with the relay, coil 706 is normally maintained operated by current over trunk conductor SET, and is momentarily released to effect the reset operation as set out heretofore.

Each lever 901 individual to the several cam wheels has an arm 912 terminating in two teeth 913 and 914. The armature 906 is provided with plate member 915 which extends the length of the wheel assembly, i. e. under all of the wheels similar to 710 and 711. Individual to each of said wheels and therefore to each of levers 901 is a trigger 916. With the armature in its operated position, spring 917 maintains the trigger flat against plate 915. A pin 918 maintains the alignment of the trigger. The right hand end of the trigger terminates in a tooth 919 which, when magnet 706 is deenergized, engages arm 912 or teeth 913 or 914, depending upon the position of lever 901 which, in turn, depends upon the position of its corresponding cam wheel.

Let it be assumed that the controller is operating in reset 6, and magnet 706 is energized. Trigger 916 will be down and away from arm 912. If the controller is to be changed to reset 4, magnet 706 will be released at the proper time in the cycle. When armature 906 springs up to the position shown, tooth 919 will be placed in position to engage tooth 913. The circuit which is completed through contacts 911 causes the reset shaft stepping magnet 702 to operate and release repeatedly to advance the reset shaft, including wheel 711, clockwise. When position 1 is reached wheel 713 will attempt to fall to the intermediate portion of the cam but is prevented from so doing by the engagement of teeth 913 and 919. It will be seen, therefore, that the contact spring engagements shown will be maintained while wheel 711 is passing through positions 1, 2 and 3 and the lamp circuits will be maintained closed, insofar as these contact springs are concerned.

Let it now be assumed that the controller is reset to position 3. The above operations will be repeated except that wheel 711 will stop in position 3. When trunk conductor SET is reenergized at the completion of the reset operation, trigger 916 will be withdrawn, permitting wheel 713 to fall to the inner radius of the cam wheel as required for this reset.

If the controller is operating in reset 2, and it is changed to reset 4, the release of 706 incident thereto will result in tooth 919 engaging tooth 914, preventing wheel 713 falling when the cam wheel passes through position 3. As the cam wheel moves to position 4, the outward movement of wheel 713 will cause tooth 913 to move past tooth 919, compressing spring 917 during this movement.

The arrangement shown permits movement of lever 901 to the right but prevents retrograde movement while the resetting operation is taking place. This prevents any contact change during the rotation of the reset shaft from position 6 to position 4 and thereby precludes lamp flicker therefrom. When the controller is operating in position 2 (all red) or position 3 (flashing amber) and the controller is reset, any flicker of the lamps would have no significance. By extension of the principle shown by Figure 9, I may prevent movement of spring actuator 904 in either direction during the resetting operation, thereby preventing any changes of the signal circuits while resetting is taking place.

Figure 6, which shows a master controller arrangement, contemplates that an alternator 605 be provided with an adjustable speed motor 604 to control the frequency transmitted over trunk conductor RS. I may use any other appropriate source of adjustable frequency current for this purpose, and one of these alternatives is shown by Figure 10. A constant speed motor 1001 is provided with a shaft 1002 to change speed gearing 1003, said gearing being shifted by means of manually operated lever 1004. The driven shaft 1005 is attached to the rotor of a wound rotor induction generator 1006 which is contemplated as being structurally similar to a wound rotor induction motor. The circuits 1007, which are connected to the rotor by means of slip rings, correspond to those from the slip rings 605 of the alternator and are similarly connected to the remainder of the master controller circuit.

As is well known, the frequency produced at the secondary of an induction motor is the slip frequency, i. e. the difference between the speed of rotation of the magnetic field and that of the rotor, giving consideration to the number of poles of the motor. With the arrangement shown, in which such a motor is employed as a generator, the frequency produced in circuits 1007 will depend upon the relative speeds of rotation of the rotor and the magnetic field. The speed of the latter is determined for a particular generator 1006 by the frequency of the alternating current supply which is provided by means of transformer 1008, the primary of which is connected to the power supply conductors. By means of motor 1001 and change speed gearing 1003, the rotor of the generator may be driven at any one of several predetermined speeds to control the frequency output at 1007, the faster the speed the lower the frequency to synchronism.

In order to control the voltage on conductors 1007, I have shown the secondary of the transformer with winding taps 1009 and a brush 1010 to operate in conjunction therewith. This brush is connected to, and controlled by, speed change lever 1004 in such a manner that the proper exciting voltage for generator 1006 is provided automatically for each speed of the rotor.

It will be obvious that I may employ an adjustable speed motor of suitable type for 1001, in which case the speed change gearing may be eliminated. The control of the circuit from the transformer taps may then be made independently or the brush 1010 cooperatively associated with the speed control means of the motor.

The present invention may include the desirable supplemental feature of turning street illuminating lights on and off from the master controller by relatively simple modifications of the intersection controllers. One arrangement for effecting this is shown by Figure 11, which indicates those elements at both the master and intersection controllers required for this particular operation, together with certain others to facilitate orientation, it being understood that the system will be operated as above described and this feature may be provided in addition thereto. Those elements carrying designations used in prior figures are, of course, the same elements as shown in such figures and operate in the previously described manner.

An additional dial 1101 is provided at the master controller. It may be similar to dial 612 (Figure 6) and function generally similar in that it is provided with an adjustable contact actuator 1102 which may open contacts 1103 at either of two times in the cycle, depending upon which of two holes the actuator is locked in. The position shown corresponds to street lights on and the alternative corresponds to them off. The contacts are normally shunted by switch 1111, which may be opened when it is desired to operate or discontinue the street lights. With the latter switch opened, the contacts 1103 will interrupt the circuit from power terminal 601, switch 603, the circuit elements associated with dials 611 and 612, represented by dash line 1104, said contacts, switch 628, trunk conductor SET, relay 706, at the intersection controller, or the equivalent, the common return conductor CR to the other power terminal 602. This is, of course, the previously described reset circuit and relay, and the release of said relay completes a circuit from local power conductor 703 to contacts 1105 and 1106.

It will be understood that the opening of contacts 1103 may occur only at times during the cycle which are different from those used for reset control of the traffic signals so there will be no conflict between the operation of the latter and street light control. With the actuator 1102 in the position shown, the circuit over conductor SET will be interrupted when contacts 1106 are closed and with the actuator in its alternative position, contacts 1105 will be closed when the interruption occurs. The above described circuit from conductor 703 will, therefore, be extended to operate relay 1107. This relay has a mechanical latch 1109 for its armature so it will remain operated. This will complete and maintain an obvious circuit for the street lights, indicated by 1110. When it is desired to shut down the street lights, actuator 1102 is moved to its alternative position and switch 1111 is opened, permitting the interruption of the circuit through conductor SET to occur with contacts 1105 closed. This will result in magnet 1108 being energized. This magnet will retract the latch 1109 to release the armature of relay 1107 and thereby open the circuit to street lamps 1110.

It will be understood that contactor 1102 may be placed on dial 612, or both it and actuator 629 placed on dial 611 with the group actuators. It also will be understood that the principles set out above whereby group control of traffic signal operations is effected may also be applied to street light control whereby groups of street lights may be turned on and off independent of other groups of lights and, of course, independent of the traffic signal operation. This could be effected by having two such actuators as 1102, each with two positions, said positions being such as to prevent conflict with each other and the traffic signal reset operations. The actuators for 1105 and 1106 at each intersection controller would be adjustable as, for example, by keys so that their contacts would be closed at times in the cycle corresponding to the effective positions of either of the street light control actuators at the master controller.

My invention sets out specific means for effecting the control of traffic in an efficient manner, with said means susceptive of great flexibility for adaptation to complex and varying problems which confront the traffic engineer. It is to be understood, however, that other arrangements may be employed within the scope of my invention. Some of these will be outlined in such manner that those practiced in the art will understand the alternative structures contemplated.

Instances may arise in practicing my invention wherein it will be desirable for each of resets 4, 5 and 6 to provide for a different ratio of proceed indication to the main as compared to the side street. This may be accomplished by having three signal split dials such as 103, each with six keys 250 (for a six element cycle) in the outer row of slots. The inner row of slots, together with the contacts actuated by keys therein, may be omitted from these dials. Instead of employing an actuator 246 for each dial which is fixed with respect thereto for operating contacts 232 associated with each of the three dials, I will provide one of the six keys in each dial with an actuating shoulder for operating said contacts. The position of this particular key will control the offset since it will control the movement of the drum controller from position 6 to position 1. The clutch magnet and its associated circuit elements will be omitted. The circuits from contacts 231 and 232 are shown by Figure 7 as extending through contacts 738 and switch 720 to operate the signal drum stepping magnet 701. With this contemplated alternative, the circuits from contacts 231 and 232 of each dial will pass through contacts associated with the reset shaft in such manner that when said shaft is in reset 4 the contacts 231 and 232, operable by keys in the first of the three dials and no others, will be connected to magnet 701 via contactor 738; in reset 5 the corresponding contacts of the second dial will be connected to the magnet and in reset 6 the third dial contacts will be effective. It will be seen, therefore, that since the keys in these dials may be placed in any of the slots, any desired ratio of proceed and stop indication may be procured, and with cycle elements of any desired relative length. My Patent No. 2,173,596 shows in Figure 4 a generally similar arrangement whereby the advance of drum controller B is effected by pins on drums 412 and 413 or those on drums 414 and 415, depending on whether the reset shaft C is in position 1 or position 2. Other minor changes will be necessary, as will be understood. In view of the teachings of this patent, the arrangement contemplated will be clear. It also will be apparent that any offset may be secured for each reset since the six keys in each of the three signal split dials may be located as desired, which also is generally similar to the teachings of this patent.

The prior art shows many arrangements for controlling signals by a continuously rotating shaft, of which Bissell 1,929,378, Leonard 2,044,617 and Vickery 1,701,399 are illustrative. With an arrangement of one of these types, or other suitable one, driven by shaft 202, I may eliminate the drum controller, and its related operating elements, of my invention and the circuit elements required for its operation. The circuits of my Figure 7 shown extending to the left from upper contacts 740—745 would then be connected to the contact closing means of the type in one of the above mentioned patents, or other suitable one, operated by shaft 202 instead of the drum controller contactors.

In many cities certain of the features which I have disclosed as, for example, resetting, are not required. It will be apparent that my invention may be simplified and adapted to such situations. This obviously could be done by eliminating the resetting elements, including the clutch magnet, the reset shaft and the controls and associated parts and circuits. All of the contacts associated with shaft 201 would therefore not be required, except 221 for resynchronization. Shaft 202 would be eliminated and dial 103 substituted for 102 on shaft 201. Contacts 231 and 232 would be arranged for actuation by six keys in the latter dial, one of which would carry an actuating shoulder for contacts 232. Other minor changes as will be understood will be required. It will be seen that as shaft 201 is revolved, the keys in the dial thereon will cause the drum controller to be advanced to effect circuit closures for the signal lamps, said circuits being terminated directly on contacts 731—737. Remote shutdown could be effected by a relay controlled from the master controller with contacts in the main supply circuit 703.

An extension of this arrangement would be to eliminate the drum controller and provide circuit closing means similar to that of Bissell, Leonard or Vickery, supra, or other appropriate type, operable by shaft 201 to directly control the signal lamps.

I show arrangements whereby the drum controller and the reset shaft are advanced by stepping magnets. I may elect to use driving motors to rotate these shafts. A further alternative which I may employ to rotate these shafts will be to provide electrical clutch arrangements whereby these shafts may be operatively associated with an extension of the shaft 241 of motor 207. These two alternative shaft driving means will require suitable control means, of course, to effect the proper positioning of said shafts as will be understood.

Alternative means of effecting total period control employing differential gearing is shown by Figures 12 and 13. A substantially constant speed motor 1201 drives shaft 1202 of the intersection controller at an appropriate speed. A pinion 1203 is keyed or otherwise affixed to the shaft. A gear 1204, with both external and internal teeth, is carried by brackets 1205 which have a hub 1206 mounted to rotate freely on shaft 1202. A pinion 1207 meshes with the external teeth of gear 1204 and drives shaft 1208, which is connected as through other gearing to shaft 201 of Figure 2 i. e. the synchronous shaft of the intersection controller. Two, or more, planetary pinions 1209 mesh with pinion 1203 on the one hand and the internal teeth of gear 1204, on the other. The pinions 1209 rotate freely on shafts 1210 which are mounted on ring 1211. The latter ring also is mounted to rotate freely on shaft 1202. Two collars 1213 lock the several elements on shaft 1202 to prevent longitudinal movement thereon. A bearing 1214 supports the opposite end of the shaft from the motor.

This arrangement comprises a differential consisting of driving gear 1203, driven gear 1204 and the planetary gears 1209. If the ring 1211 is stopped, gear 1204 will be driven in the opposite direction from shaft 1202. If the ring is permitted to turn freely, gear 1204 will stop since it is connected to the load of the controller through shaft 1208 and the pinions 1209 will rotate on their respective axes and revolve around shaft 1202. By controlling the speed of rotation of ring 1211, the total period of the traffic cycle is controlled.

A side view of the differential arrangement, with certain parts in section, is shown by Figure 13. It will be seen by this figure that the ring 1211 has a series of equi-distant teeth 1301 on its periphery, of which eight are indicated for illustration. A detent 1302 is normally maintained in engagement with one of the teeth by spring 1303, which is attached to a suitably fixed member of the controller, which prevents the rotation of the ring. A magnet 1304 when energized, withdraws the detent, permitting the ring 1211 to rotate freely to result in the controller stopping.

At the master controller are power terminals 601 and 602, of which the latter is preferably the grounded side of the distribution system. A disc 1305 at the master controller is driven by an adustable speed motor, not shown, or other suitable adjustable speed means. Four, more or less as desired, teeth are provided on the periphery of this disc, and each is arranged to momentarily close contacts 1306. The latter complete a circuit from power terminal 601 at the master controller, said contacts, trunk conductor SC to the winding of magnet 1304, the common return conductor CR to the other power terminal 602, to result in said magnet being energized to withdraw detent 1302 to permit the free rotation of ring 1211 and stop the controller. After sufficient time to permit the tooth on ring 1211 to pass the detent, contacts 1306 are opened, releasing the detent so that the latter stops the next tooth for an interval determined by the next closure of contacts 1306. Since the synchronous shaft of the intersection controller is stopped when ring 1211 is rotating and rotates when the ring is stopped, it follows that the synchronous shaft will be operated in a series of steps. It also will be seen that due to the differential, the total period of the cycle will be an inverse function of the speed of rotation of the ring. The speed of rotation of the ring will be a direct function of the speed of disc 1305, which is adjustable. It follows, therefore, that the total period of the cycle of the controller will be an inverse function of the speed of disc 1305, so that said cycle may be widely adjusted from the master controller by controlling the speed of rotation of disc 1305.

The arrangements shown may be adapted to maintain the intersection controllers in synchronism with the master controller. A second magnet 1307 is provided to actuate an armature 1308, an extension of which terminates in a slip link 1315 cooperating with detent 1302 in such manner that the detent may be withdrawn by either magnet 1304 or 1307. Armature 1308 is normally maintained against fixed stop pin 1309 by spring 1310.

An actuator 1311 for contacts 1312 is provided. This disc, or an operative equivalent, is affixed to the synchronous shaft of the intersection controller so that said contacts are closed once each cycle. There will be provided at the master controller a replica of the intersection controller driving arrangements, including a differential, so that a shaft thereat will revolve at the same speed as the synchronous shaft of the intersection controllers. To this master controller shaft is affixed a contact actuator 1313 to momentarily open contacts 1314 once each cycle. If the intersection controller reaches the synchronizing point and closes contacts 1312 before contacts 1314 are opened, a circuit may be traced from power terminal 601, closed contacts 1314, trunk conductor RSYN, contacts 1312, magnet 1307, the common return trunk conductor CR to power terminal 602, to result in detent 1302 being withdrawn to stop the intersection controller. When contacts 1314 are opened, indicating that both controllers are in synchronism, magnet 1307 will release to permit the controller to be restored to operation. Since the driving motor 1201 for the intersection controller and the corresponding one at the master controller will preferably be of the synchronous type energized from the same alternating current power supply, the controllers will normally remain in step so that the closure of contacts 1312 and the opening of 1314 will be simultaneous.

Should the power supply for the master controller be interrupted or the trunk conductors fail, dog 1302 will maintain the ring 1211 stopped, and the intersection controllers will continue to operate with a relatively short total period. If synchronous driving motors are used at the intersection controllers, they will continue to operate in synchronism under this condition.

The differential shown is of the planetary type, but it is apparent that one of the type shown by Figure 2 could be employed with this embodiment of my invention, in which case the ring 1211 would be substituted for gear 206. Conversely, the planetary differential may be used with the embodiment set forth by Figure 2, in which case a gear similar to 206 would be substituted for ring 1211, and motor 208 would drive said gear.

It will be understood that with the embodiment of my invention shown by Figure 12 and 13, obvious minor changes will have to be made in the circuits and arrangements set out in the primary embodiment of my invention.

It is to be understood that the principles of speed control employing differential arrangements are suitable for applications to other devices and machines as well as to traffic controllers.

It will be recognized that resetting of individual signal controllers may be effected within the scope of the principles disclosed herein and in a manner generally similar to that set out in my aforesaid Patent No. 2,173,596. To illustrate one method of accomplishing this, it will be recognized that many more special resets than the three specifically shown may be provided with corresponding facilities for keys 109 in slots in dial 102. If it is desired to reset individually twelve controllers, in addition to all of the operations and features described in the preferred embodiment of my invention, twelve additional slots will be provided and a key placed in a relatively different slot at each of the twelve controllers. It will be seen that the opening of the circuit through conductor SET at the master controller by appropriate circuit controlling means when any one of these controllers has its key engaging its associated contacts will result in that controller only being reset, and the particular reset will depend upon the distance key 109 thereof has been inserted in the dial. In this manner any one of the twelve may be individually reset. It will be understood that such an arrangement may require changing the angular space involved for the group reset controls to provide space within the cycle for the individual control operation.

A further extension of this principle will permit all of the signals of the system to be individually reset. Let it be assumed that fifty separate reset operations may be secured in a cycle. With this contemplated alternative arrangement, an extra conductor would be provided for each fifty controllers with a relay in each controller connected thereto. When this relay is released it will extend a circuit from power conductor 703 to an additional set of contacts similar to 225, said contacts being connected to, say, brush 2 of commutator wheel 718, or to any other similar brush as desired. Each controller of the group of fifty will have an actuator affixed to its shaft 201 to close said contacts similar to 225, with said actuator at each intersection controller arranged to close its associated contacts at a different time during each cycle. It follows that if said relay is released by interrupting the circuit over the above-mentioned auxiliary conductor at the master controller when any one of the fifty controllers has its auxiliary contacts closed that controller, and it only, will be reset. This same arrangement, of course, may be employed for each of the other groups of fifty controllers and may be used in conjunction with other features of my invention set out above.

One application of this individual controller reset feature will permit the change of signals along a fire apparatus route to all red or other suitable display. This will make desirable the provision of control means at the master controller individual to each intersection controller for facilitating the selection of the particular signals along the route. My aforementioned patent shows one arrangement for effecting this by using a bank of contacts and a wiper operating in conjunction therewith for each fifty controllers, said wiper being rotated in synchronism and appropriate phase relation with respect to the synchronous shaft of the intersection controllers. With fifty intersections so controlled by one auxiliary trunk conductor, fifty contacts would be provided in each bank with a key associated with each contact and corresponding to a distant intersection. The operation of any key would result in the circuit through the auxiliary trunk conductor being momentarily interrupted to reset the corresponding distant controller. In view of the teachings of my said patent it is believed that this arrangement will be readily understood by those skilled in the art and detail circuits consequently have been omitted. Other suitable arrangements with this objective in view may, of course, be used.

The latter mentioned arrangements contemplate that electrical energy will normally be extended over the auxiliary trunk conductor and resetting will be effected by interrupting the circuit thereover. It would be an obvious expedient to reverse this arrangement and to transmit an impulse for resetting, in which case a connected relay at the intersection controllers when operated would complete a resetting circuit to the reset contacts similar to 225.

I have shown specific arrangements for driving the master and intersection controllers, but it will be understood that the broad principles of resetting disclosed may be employed with other driving means. While it would be preferable for the intersection controllers to be driven in true synchronism with each other and the master controller, this is not imperative. Other driving arrangements which will operate the several controllers in approximate synchronism may be used, in which case not as many different resetting operations may be reliably employed as with a synchronous arrangement. With an approximately synchronous scheme, the arc of contacts at the intersection controllers would have to be somewhat wider and spaced further apart to allow for speed variations, as an illustration of the requirements for reducing such an arrangement to practice.

I have indicated a motor and differential arrangement similar to that employed at the intersection controllers for driving the master controller. It would be an obvious alternative to have said controller driven by motor 604 shown by Figure 6 or motor 1001 shown by Figure 10 through suitable gearing.

The employment of conductor RS for controlling the total period and also for resynchronizing the intersection controllers results in the acceleration of the latter when resynchronizing takes place. By employing separate trunk conductors for period control and resynchronization, with the former connected to motor 208 and the latter to relay 705, these functions may be separated and the intersection controllers will then normally operate at exact synchronous speed as controlled by the frequency transmitted from the master controller. The minor changes in the circuits and arrangements to effect this alternative will be understood by those practiced in the art.

In claiming my invention I may use the term "method of operation," or similar expression, which will be understood to be synonymous with the term "reset" defined above. Such use may include discontinuance of the signals, or shutdown, as one method of operation.

This invention has been illustrated and described in connection with a system for controlling traffic signals. However, it is to be understood that the apparatus, circuits and principles of operation disclosed are applicable to other control systems. It is also to be understood that the sub-systems per se, in contradistinction to the disclosed system as a whole, may be used separately to accomplish the functions contemplated thereby. Also, I do not intend that the present invention shall be restricted to the specific structural details, arrangements of parts or circuit connections herein set forth, as various modifications thereof may be effected without departing from the spirit and scope of my invention. I desire that only such limitations shall be imposed as are indicated in the appended claims.

What I claim as new and desire to secure by Letters Patent of the United States, is:

1. In a traffic controller, in combination, a constant speed driving motor, circuit closing means, gearing including a gear driven by said motor, a gear to drive said circuit closing means and a third gear, which is pivotally mounted on a rotatable member, cooperating with first two gears to comprise a differential with said first gear tending to drive said circuit closing means and said member and effective to drive said circuit closing means with said member stopped and effective to drive said member instead of said circuit closing means with said member free to rotate and means variably operable to periodically stop the rotation of said member whereby said circuit closing means is driven at an adjustable speed in a series of steps each revolution.

2. In a street traffic control system, in combination, a master controller, means to drive the master controller at an adjustable speed, a remotely disposed circuit controller including circuit actuating means, circuit actuated traffic controlling devices operated cyclically under control of last said means, circuit means interconnecting said controllers, a substantially constant speed driving motor at said remote controller, a gear element driven by said motor, a second gear element to drive said circuit actuating means and a third gear element in differential relationship with first two mentioned elements and adapted to cause said circuit actuating means to be driven at a speed which is a function of the speed of rotation of said third element, means controllable from said master controller over said interconnecting circuit means to control the speed of rotation of said third element whereby the period of the cycle of said traffic controlling devices is varied inversely in proportion to the speed of the master controller, and means including said interconnecting circuit means for maintaining said circuit actuating means in synchronism with said master controller.

3. In a street traffic control system, a circuit controller, a substantially constant speed motor, an adjustable speed motor, differential gearing interconnecting said controller and said motors and adapted to drive said controller at a speed which is a function of the relative speeds of said motors, a remotely disposed master controller, means for driving the master controller at an adjustable speed, circuit means interconnecting said master controller with said circuit controller, means functioning over said circuit means for controlling the speed of said adjustable speed motor from said master controller whereby the speed of said circuit controller is varied in accordance with the speed of the master controller and means functioning over said circuit means for maintaining the circuit controller in synchronism with, and predetermined phase relation to, the master controller.

4. In a control system, in combination, a master controller, a remotely disposed controller, circuits interconnecting said controllers, a substantially constant speed driving motor for said remote controller, differential gearing including a gear driven by said motor, a gear to drive said controller and a third gear pivotally affixed to a rotatable member and cooperating with said first two mentioned gears whereby the speed of rotation of said controller driving gear is an inverse function of the speed of rotation of said member, and means operable from said master controller and functioning over said circuit connections to permit the rotation of said member in a series of controlled steps each revolution.

5. In a control system, the combination of a motor, a shaft driven by said motor, circuit controlling means, a clutch interposed between said shaft and said circuit controlling means and adapted, in its engaged position, to cause said circuit controlling means to be driven in repeated cycles in a definite operating relation to said shaft, and means to cause said circuit controlling means to be driven cyclically in another predetermined relation to said shaft, last said means including means selectively operable to disengage said clutch to cause said circuit controlling means to be stopped until the shaft has rotated to the predetermined relation between itself and the circuit controlling means and means responsive to the establishment of said other operating relation to automatically reengage the clutch when the latter relation has been established.

6. In a control system, the combination of a master controller, a circuit controller provided with a motor, a circuit actuator driven by said motor, circuit closing means, means to drive said circuit closing means in any one of a plurality of predetermined phase relations with respect to said circuit actuator, last said means including clutch means interposed between said actuator and said circuit closing means, means for momentarily closing said circuit closing means during the operation of said circuit closing means at variable intervals in a recurrent cycle, a drum controller, means for advancing said drum controller to a different position at each actuation of said circuit closing means, means for maintaining said drum controller in a definite operating relation with said circuit closing means, means for maintaining a predetermined phase relation between said master controller and said circuit actuator and means to control the operation of said clutch from said master controller.

7. In a control system, a first station, electrical energy transmitting means thereat, a second station, a source of electrical energy thereat, circuits interconnecting said stations, electrical devices at said second station, a cyclically operated controller adapted to interconnect said devices with said source of energy to operate them at predetermined times in recurrent cycles, means to control the operation of said devices, a circuit closer normally operated over said interconnecting circuits by said energy transmitting means at said first station, a cyclical circuit actuator interposed between said circuit closer and said means to control said devices and adapted to selectively operate last said means depending upon which one of particular parts of the cycle the circuit actuator is in when said circuit closer is released, and means at said first station selectively operable to interrupt the transmission of energy to release said circuit closer at any of said parts of the cycle of said actuator to selectively effect any one of a plurality of different operations of said devices.

8. In a control system, in combination, a first station, electrical energy transmitting means thereat, a second station, circuits interconnecting said stations, cyclical circuit controlling means at said second station, electrical devices at said second station, means to operate said devices at particular times in repeated predetermined cycles, energy responsive means normally operated by energy transmitted from the first station over said interconnecting circuits to selectively control the operation of said devices, circuit connecting means between said circuit controlling means and said energy responsive means, and means to operate said devices in another predetermined manner, last said means including means to interrupt the transmission of energy from first said station over said interconnecting circuits at a particular time during the cycle of said circuit controlling means and said energy responsive means.

9. In a traffic signal system, in combination, a master controller, a constant speed motor, rotary circuit closing means including a plurality of keys which may be adjustably positioned to control the circuit closures, a differential interposed between said motor and said circuit closing means, means including said differential for controlling the speed of rotation of said circuit closing means, a drum controller, means for advancing said drum controller to a different position at each above mentioned circuit closure, means for maintaining said drum controller in a definite operating relation with said circuit closing means and means for maintaining a predetermined phase relation between said master controller and said circuit closing means.

10. In a signal system, the combination of a master controller, a circuit controller provided with a substantially constant speed motor, circuit closing means, gearing interposed between said motor and said circuit closing means, including a gear element driven by said motor, a gear element to drive said circuit closing means and a third gear element in differential relationship with first two mentioned gear elements whereby said circuit closing means is driven at a speed which is a function of the speed of rotation of said third gear element, means to vary the speed of rotation of said third gear element from the master controller whereby the speed of operation of said circuit closing means is varied, means for momentarily closing said circuit closing means during its operation at variable intervals in a recurrent cycle, a drum controller, means for advancing said drum controller to a different position at each actuation of said circuit closing means, means for maintaining said drum controller in a definite operating relation with said circuit closing means, and means for maintaining a predetermined phase relation between said master controller and said circuit closing means.

11. A control system including, in combination, a motor driven master controller, a remotely disposed controller, circuits interconnecting said controllers, a substantially constant speed driving motor for said remote controller, differential gearing including a gear driven by said motor, a gear to drive said controller and a third gear pivotally affixed to a rotatable member and cooperating with said first two mentioned gears whereby the speed of rotation of said controller driving gear is an inverse function of the speed of rotation of said member, means actuated over the interconnecting circuits for intermittently stopping the rotation of said member to cause the controller to be driven and releasing the member to cause the controller to be stopped whereby the remote controller is driven in a series of steps substantially in synchronism with the master controller and means to restore the remote controller to synchronism with the master controller should it deviate therefrom, last said means including means responsive to a deviation from synchronism for causing the member to be released to stop the controller until synchronism is restored.

12. A circuit controller including, in combination, a motor driven shaft, a circuit actuator, a normally engaged clutch to cause the actuator to be driven by the shaft, means for selecting either of a plurality of predetermined operating relations in which the actuator may be driven by the shaft and means responsive to actuation of the selecting means for disengaging the clutch until the selected operating relation is established and for thereupon reengaging the clutch.

13. A circuit controller including, in combination, a motor driven shaft, a second shaft, a circuit actuator operated by the second shaft, normally engaged clutching means to cause the second shaft to be driven by the motor driven shaft in either of a plurality of predetermined phase relations of the motor driven shaft whereby the circuit actuator is operated in corresponding phase relations thereto, means for selecting either of said predetermined phase relations in which the second shaft may be driven and means controlled jointly by the two shafts and the selecting means for disengaging the clutching means subsequent to the selection of a phase relation different from that in which the second shaft is then being driven to cause the second shaft to be stopped until the selected phase relation is established and to thereupon effect the reengagement of the clutching means.

14. A circuit controller including, in combination, a motor driven shaft, a circuit actuator, a second shaft to operate the actuator, a normally engaged clutch to cause the second shaft to be driven by the motor driven shaft, a pair of normally closed contacts, means operated by the motor driven shaft to open the normally closed contacts momentarily once each revolution of latter said shaft, a plurality of pairs of normally open contacts, means operated by the second shaft to close the pairs of normally open contacts momentarily at times during each revolution of the second shaft predetermined individually for each of latter said pairs of contacts, an electromagnet energizable to disengage the clutch to stop the second shaft, an electrical circuit including the electromagnet, the normally closed contacts and one of the pairs of normally open contacts to cause the electromagnet to be energized if the latter normally open pair of contacts is closed without the normally closed ones being open to stop the shaft until the normally closed contacts are opened whereby an operating relation between the two shafts is established and maintained dependent upon the particular pair of the normally open contacts connected in said circuit and means to selectively connect either of the plurality of normally open pairs of contacts in said circuit.

15. A circuit controller including, in combination, a circuit actuator, a constant speed driving motor, a second motor, means to control the speed of the second motor, a drive shaft, a differential interconnecting the drive motor, the second motor and the drive shaft whereby the drive shaft is driven at a speed which is a function of the speed of the second motor, a second shaft to drive the circuit actuator, normally engaged clutching means adapted to cause the second shaft to be driven by the drive shaft in either of a plurality of predetermined phase relations thereto, means for selecting either of said predetermined phase relations and means controlled by the selecting means for disengaging the clutching means to stop the actuator until the selected phase relation has been established whereby said circuit actuator may be operated cyclically with an adjustable period and in either of the predetermined phase relations to the drive shaft.

16. In a control system the combination of a master controller, a circuit controller provided with a motor, a shaft driven by the motor, means for maintaining a predetermined operating relation between the shaft and the master controller, a circuit actuator, clutching means interposed between the shaft and the actuator adapted to cause the actuator to be driven cyclically by the shaft and means for selectively controlling the clutching means from the master controller to effect either of a plurality of operating relations between the actuator and the shaft.

17. A control system including a master controller, a plurality of individually driven secondary controllers, devices associated with, and operated by, each secondary controller, a shaft in each latter said controllers, means to drive each of said shafts in synchronism with, and predetermined phase relation to, the master controller, means including a circuit actuator in each secondary controller to effect cyclical operation of the devices associated therewith, a normally engaged clutch in each secondary controller adapted to cause the actuator thereof to be driven by the shaft predetermined individually for each secondary controller, means at the master controller selectively operable to effect transmission of signals to the secondary controllers jointly while the shafts thereat are in either of a plurality of predetermined positions, selective means in the latter controllers variably responsive to received signals dependent upon the position of their shafts when the signals are received to select either of said phase relations and means responsive to latter said means for effecting either of said phase relations by disengaging the clutch until said phase relation is established and thereupon reengaging it whereby the devices of the system may be operated cyclically under control from the master controller with either of a plurality of offsets.

18. A traffic control system including a master controller, a plurality of intersection controllers each provided with a shaft, with means to drive the shaft in synchronism and predetermined phase relation with the master controller, with a circuit actuator, with normally engaged clutching means adapted to cause the actuator to be driven by the shaft, with means to select either of a plurality of predetermined operating relations between the shaft and the actuator, with means responsive to the selecting means for disengaging the clutching means until a selected operating relation is established and thereupon reengaging it, with means to control the selecting means to select either of said operating relations in response to signals from the master controller dependent upon the specific position within an angular sector a shaft is in when the signal is received and with adjustable means to make the selecting means responsive to signals in either one of a plurality of predetermined angular sectors; and means at the master controller selectively operable to transmit signals to the plurality of intersection controllers with the shafts thereat in either of said specific positions in either of said sectors whereby the intersection controllers may be reset in groups dependent upon the angular sectors in which they are responsive to signals and the specific reset of the separate controllers of each group dependent upon the specific position of the shafts thereof within that sector when the signal is received.

19. The combination as set out by claim 18 with means to make particular intersection controllers responsive to signals received in two angular sectors of their shafts whereby the intersection controllers may be reset by primary groups and said particular controllers of said groups may be reset without affecting the other controllers of their respective groups.

20. In a control system, in combination, a master controller, a circuit controller provided with a motor, a circuit actuator, a normally engaged clutch to cause the actuator to be driven by the motor, means including said clutch to cause said actuator to be driven in synchronism with, and in either of a plurality of predetermined operating relations to, said master controller and means for selectively controlling the clutch from the master controller to effect either of said plurality of operating relations between the actuator and the master controller.

21. In a control system, the combination of a master controller, a circuit controller provided with a motor, a circuit actuator, a clutch interposed between said motor and said actuator adapted to cause the actuator to be driven by said motor, circuit means interconnecting the master controller and the circuit controller, means functioning over said circuit means for causing said actuator to be driven by said motor in synchronism with, and in either of a plurality of predetermined operating relations to, said master controller, means at the master controller for selecting either of said predetermined operating relations, and means at the circuit controller responsive to the actuation of said selecting means to select any one of said operating relations to cause said clutch to be disengaged to stop the actuator until the selected operating relation has been established and to thereupon reengage the clutch to cause the actuator to be driven in the operating relation thus established.

22. In a traffic signal controller, the combination of a rotatable signal control switch, a single timing dial, means including actuators upon said dial to effect an intermittent rotation of said control switch in accordance with any one of a plurality of adjustable sequences, and means for maintaining said dial in a predetermined synchronous relationship with said control switch at one common instant of each revolution irrespective of which sequence is in effect.

23. In a traffic signal control system, the combination of a master controller, a secondary controller having a drum switch, a single dial, means including actuators on said dial for selectively operating said drum at one of a plurality of sequences, means on said dial for effecting synchronism between said drum switch and said dial during a predetermined common period of said sequences, and means in said master controller for selecting the sequence under which said controller is to operate.

JUDSON O'D. SHEPHERD.

REFERENCES CITED

The following references are of record in the file of this patent:

UNITED STATES PATENTS

| Number | Name | Date |
|---|---|---|
| Re. 21,635 | Leonard | Nov. 26, 1940 |
| 206,734 | Jacker | Aug. 6, 1878 |
| 1,265,329 | Henderson | May 7, 1918 |
| 1,554,028 | Price | Sept. 15, 1925 |
| 1,837,803 | Weston | Dec. 22, 1931 |
| 1,849,882 | Pearson | Mar. 17, 1932 |
| 1,929,378 | Bissell | Oct. 3, 1933 |
| 1,993,056 | Goodrich | Mar. 5, 1935 |
| 2,045,127 | Diebold | June 23, 1936 |
| 2,081,652 | Turner et al. | May 25, 1937 |
| 2,103,907 | Kearsley | Dec. 28, 1937 |
| 2,133,157 | Turner et al. | Oct. 11, 1938 |
| 2,224,697 | Roseby | Dec. 10, 1940 |
| 2,236,297 | Reid | Mar. 25, 1941 |
| 2,246,208 | Hobbs | June 17, 1941 |

FOREIGN PATENTS

| Number | Country | Date |
|---|---|---|
| 511,877 | France | Oct. 1, 1920 |